United States Patent
Peters et al.

(10) Patent No.: US 12,430,975 B2
(45) Date of Patent: Sep. 30, 2025

(54) BANKNOTE WITH PROCESSOR

(71) Applicant: Bundesdruckerei GmbH, Berlin (DE)

(72) Inventors: Florian Peters, Berlin (DE); Dieter-Heinrich Sauter, Munich (DE)

(73) Assignee: BUNDESDRUCKEREI GMBH, Berlin (DE)

( * ) Notice: Subject to any disclaimer, the term of this patent is extended or adjusted under 35 U.S.C. 154(b) by 224 days.

(21) Appl. No.: 18/000,584

(22) PCT Filed: Jun. 4, 2021

(86) PCT No.: PCT/EP2021/065023
§ 371 (c)(1),
(2) Date: Dec. 2, 2022

(87) PCT Pub. No.: WO2021/245242
PCT Pub. Date: Dec. 9, 2021

(65) Prior Publication Data
US 2023/0267790 A1     Aug. 24, 2023

(30) Foreign Application Priority Data
Jun. 5, 2020 (DE) .................. 10 2020 115 034.2

(51) Int. Cl.
*G07D 7/01* (2016.01)
*B42D 25/29* (2014.01)
(Continued)

(52) U.S. Cl.
CPC ............. *G07D 7/01* (2017.05); *B42D 25/29* (2014.10); *B42D 25/305* (2014.10);
(Continued)

(58) Field of Classification Search
CPC ...... G07D 7/01; G07D 2207/00; B42D 25/29; B42D 25/305; G06Q 20/3829; G06Q 20/383; G06Q 20/347; G07F 7/082
See application file for complete search history.

(56) References Cited

U.S. PATENT DOCUMENTS 10,825,017 B1 * 11/2020 Johnson ............... G06Q 20/341
11,887,102 B1 * 1/2024 Walsh .................. G06Q 20/348
(Continued)

FOREIGN PATENT DOCUMENTS

DE         10163266 A1      7/2003

OTHER PUBLICATIONS

Lipton et al, Digital trade coin: towards a more stable digital currency, Jun. 18, 2018, Royal Society Open Science, pp. 1-15 (Year: 2018).*

(Continued)

*Primary Examiner* — John W Hayes
*Assistant Examiner* — Yingying Zhou
(74) *Attorney, Agent, or Firm* — Harness, Dickey & Pierce, P.L.C.

(57) ABSTRACT

A banknote includes a processor and a memory. An identification number of the banknote is stored in the memory of the security element and identifies an anonymous banknote account managed by a central bank issuing the banknote and individually assigned to the corresponding banknote. A banknote-specific cryptographic key is stored in a protected memory area of the memory. A payment method executed with the banknote receiving a payment request for a payment with the banknote, generating a payment-specific cryptogram for authorising the payment with the banknote, wherein the cryptogram is generated from the identification number of the banknote and a payment-specific code as input values using the banknote-specific cryptographic key, (Continued)

Figure 1A:
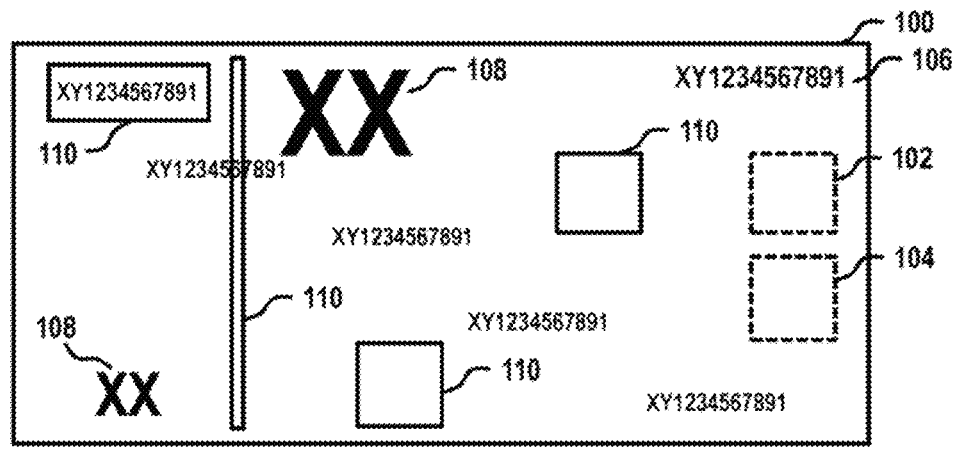

and sending a payment authorisation including the payment-specific cryptogram.

17 Claims, 10 Drawing Sheets

(51) Int. Cl.
 *B42D 25/305* (2014.01)
 *G06Q 20/38* (2012.01)
(52) U.S. Cl.
 CPC ....... *G06Q 20/3829* (2013.01); *G06Q 20/383* (2013.01); *G07D 2207/00* (2013.01)

(56) References Cited

U.S. PATENT DOCUMENTS

| | | | |
|---|---|---|---|
| 2005/0150740 A1* | 7/2005 | Finkenzeller | G07D 7/01 194/207 |
| 2017/0246899 A1* | 8/2017 | Cok | G07D 7/01 |
| 2017/0313119 A1 | 11/2017 | Cok et al. | |
| 2018/0189781 A1* | 7/2018 | McCann | G06Q 20/202 |
| 2019/0005493 A1* | 1/2019 | Francesco | H04L 9/0822 |
| 2019/0384955 A1* | 12/2019 | Frieser | G06T 7/0002 |

OTHER PUBLICATIONS

Han et al., A Blockchain-based Framework for Central Bank Digital Currency, 2019, IEEE, pp. 263-268 (Year: 2019).*
FG-DFC, Reference Architecture and Use Cases Report, Jul. 2019, ITU-T, pp. 1-61 (Year: 2019).*
International Search Report and Written Opinion thereof dated Oct. 7, 2021 for corresponding International Application No. PCT/EP2021/065023.
"Reference Architecture and Use Cases Report; DFC-0-014", ITU-T Draft; Study Period 2017-2020; Focus Group DFC; Series DFC-0-014, International Telecommunication Union, Jul. 16, 2019, XP044273297.
International Preliminary Report on Patentability dated Dec. 15, 2022 for corresponding International Application No. PCT/EP2021/065023.
A. M. Antonopoulos, Mastering Bitcoin—Chapter 7—The Blockchain O'Reilly Media, Inc., Dec. 2014.
Blockchain, *Wikipedia*, 2020, retrieved on the internet Mar. 27, 2020 https://en.wikipedia.org/wiki/Blockchain.
S. Nakamoto, 'Bitcoin: A Peer-to-Peer Electronic Cash System' Oct. 2008, pp. 1-9, retrieved from the internet Jul. 4, 2017 https://nakamotoinstitute.org/static/docs/bitcoin.pdf.
D. Schwartz, 'The Ripple Protocol Consensus Algorithm' Ripple Labs Inc, Jan. 2014, retrieved on the internet Apr. 19, 2018 https://ripple.com/files/ripple_ consensus_whitepaper.pdf.

* cited by examiner

BANKNOTE WITH PROCESSOR

CROSS-REFERENCE TO RELATED APPLICATIONS

This application is a national phase under 35 U.S.C. § 371 of PCT International Application No. PCT/EP2021/065023 which has an International filing date of Jun. 4, 2021, which claims priority to German Application No. 10 2020 115 034.2, filed Jun. 5, 2020, the entire contents of each of which are hereby incorporated by reference.

The invention relates to a banknote and methods for issuing, using and replacing banknotes. The invention also relates to a method for processing payments using a terminal.

In the course of increasing digitalisation, cashless payment instruments are coming more and more to the fore nowadays, especially based on electronic payment processing methods. In cashless payment transactions, a transfer of payment means takes place without cash being transferred. In cash payments, cash, i.e. banknotes or coins, is exchanged between the payer and the payee, whereas in a cashless payment there is no such exchange of cash.

Cash, for example, has the advantage that it is available to everyone and may be used quickly as well as everywhere. For example, a bank account is not required for processing of a cash-based payment. In addition, cash is often valued by its owners as a store of value.

By contrast, cashless payment methods have the advantage, for example, that they allow efficient payment processing even if the payer and payee are in distant locations, as is the case with purchases over the internet. This is something that cannot be done using known banknotes.

The invention therefore addresses the problem of creating an improved banknote.

The problem underlying the invention is solved with the features of each of the independent claims. Embodiments of the invention are indicated in the dependent claims.

Embodiments comprise a banknote. The banknote comprises a security element having a processor and a memory with program instructions. An identification number of the banknote is stored in the memory of the security element and identifies an anonymous banknote account managed by a central bank issuing the banknote and individually assigned to the corresponding banknote. A banknote-specific cryptographic key is stored in a protected memory area of the security element memory.

The processor is configured to execute a payment method with the banknote when the program instructions are executed. The payment method comprises:
  receiving a payment request for a payment with the banknote,
  generating a payment-specific cryptogram for authorising the payment with the banknote, wherein the cryptogram is generated from the identification number of the banknote and a payment-specific code as input values using the banknote-specific cryptographic key,
  sending a payment authorisation comprising the payment-specific cryptogram.

According to embodiments, the banknote comprises, for example, a visual indication of a serial number uniquely identifying the banknote. According to embodiments, the banknote comprises, for example, a visual indication of the identification number. According to embodiments, the banknote comprises, for example, a visual indication of an initial nominal value associated with the banknote.

According to embodiments, the banknote comprises, for example, a communication interface via which it may receive the payment request and/or send the payment authorisation. For example, the communication interface is configured to communicate with a terminal for the purpose of receiving the payment request and/or sending the payment authorisation. For example, the payment request received via the communication interface is forwarded to the processor. The payment authorisation is sent by the processor to the communication interface for further transmission. According to embodiments, the banknote comprises, for example, an input device for receiving the payment request and/or an output device for outputting the payment authorisation, which is sent from the processor to the output device for the purpose of the output. The payment request received via the input device is forwarded to the processor, for example.

Embodiments may have the advantage that the banknote may not only be used as a means of cash payment in the usual sense, but that a cashless payment may also be executed with the banknote. When used as a cash payment instrument in the usual sense, the banknote is handed over by the payer to the payee in the course of the payment processing or the payee hands over the corresponding banknote to the payer as change in the course of the payment processing. When the banknote is handed over, ownership of the banknote passes from the transferor to the recipient. With the ownership of the banknote, the ownership of the current nominal value of the banknote, i.e. the nominal value assigned to the banknote account of the banknote, is also transferred to the recipient.

When used for a cashless payment, i.e. without handing over the banknote or transferring ownership of the banknote, the payment is made by the banknote providing a payment-specific cryptogram. This cryptogram authorises a transaction in which the amount to be paid is transferred from the banknote account of the banknote to an account of the payee.

The payment authorisation or payment release sent includes the corresponding payment-specific cryptogram for authorising or releasing the corresponding payment or transaction. For example, a successful authentication of a terminal with respect to the banknote or a successful authentication by the banknote of the terminal from which, for example, the payment request is received may be a prerequisite for generating the payment-specific cryptogram for authorising the payment and/or for sending the payment authorisation comprising the payment-specific cryptogram. Corresponding authentication may be performed, for example, using cryptographic keys and/or digital certificates. For example, a signature created by the terminal using a private cryptographic key as signature key is verified using a public cryptographic key provided by a certificate of the terminal as signature verification key.

For example, the amount of money in circulation that may be transferred both in a cash-based and cashless manner is defined by the amount of money or the sum of the nominal values assigned to banknote accounts of banknotes. For example, the amount of money in circulation remains the same if the banknotes in circulation are maintained. This means, for example, that banknotes in circulation may remain the same, but as a result of transactions the nominal values assigned to individual banknotes may change. For example, it would also be possible to change the money supply allocated to the banknotes without the banknotes in circulation if the central bank allows payment transfers from banknote accounts to other accounts, for example to other systems, such as the GIRO SEPA system, and vice versa.

Since neither the banknote nor its banknote account are assigned to a legal or natural person, the banknote allows, for example, both cash-based and cashless anonymous payments, which are currently only possible with cash. To prevent misuse, additional restrictions could be implemented, for example, limiting the amount of money that may be transferred and/or providing additional verification mechanisms for certain amounts of money. Corresponding verification mechanisms could, for example, require a release of the transaction by the central bank on the basis of a verification of additional information, that has been determined to be necessary, relating to the corresponding transaction.

The banknote and thus its nominal value according to the banknote account may be passed on, for example, by manual physical transfer, i.e. a digital currency may be transferred. This does not require, for example, a personal account of the user of the banknote, i.e. an account assigned to a legal or natural person. For example, material and effort may be saved by reducing the purely analogue currency. In particular, the effort involved in the physical transfer and transport of banknotes may be reduced. Such a banknote may, for example, be revalued and used for direct contactless payment, without or only with limited control or tracking, since an individual banknote may be passed on at any time as in the case of classic cash.

For example, the current nominal value of the banknote is also stored in the memory of the security element. The actual nominal value of the banknote is determined by its nominal value according to the banknote account. For example, the nominal value stored in the banknote may be used to determine the actual nominal value offline. For example, the nominal value stored in the banknote is updated when a transaction confirmation signed by the central bank is forwarded to the banknote to complete a transaction. For example, the security element has a signature verification key to verify digital signatures from the central bank.

The actual nominal value of a banknote, for example, is determined solely by the nominal value or the credit balance of the banknote account that is assigned to the banknote. In order to be able to have at disposal the credit balance of the banknote account and thus the nominal value of the banknote, it is necessary to be in possession of a banknote that is genuine for the corresponding banknote account and has a banknote-specific cryptographic key.

For example, on the basis of the current nominal value determined, a decision may be made as to whether a cash payment or a cashless payment should be made with the banknote. If the current nominal value is identical to the amount to be paid, a cash payment is made, for example, in which the banknote is handed over to the payee and ownership of it is transferred to the payee. If the current nominal value is greater than the amount to be paid, a cashless payment is made, for example. In a cashless payment, for example, a corresponding payment request is sent to the banknote for a payment in the form of a transaction of an amount to be paid from the banknote account of the banknote to an account, for example banknote account, of a payee. The banknote may authorise this transaction with a payment-specific cryptogram.

If the current nominal value is greater than the amount to be paid, it would also be possible for a cash payment to be made and the excess amount to be returned by the payee as change, for example in the form of cash, such as banknotes with a matching nominal value.

For example, the current nominal value may assume any positive value including zero. For example, the banknote account cannot be overdrawn. For example, the current nominal value may be any value between zero and a predefined maximum nominal value. For example, the current nominal value may be any value greater than or equal to a predetermined minimum nominal value. For example, the current nominal value may be any value from and including a predetermined minimum nominal value to and including a predetermined maximum nominal value.

For example, the nominal value of the banknote may comprise a guaranteed minimum nominal value and a variable additional nominal value portion. For example, the minimum nominal value may only be paid in the form of a cash payment with the handover of the banknote, while the variable additional nominal value portion may be used in the course of a cash-based or cashless payment processing. In other words, the banknote could only be used for non-cash payments where the remaining nominal value of the banknote is greater than or equal to the minimum nominal value. If the banknote is to be used to pay an amount that would result in a remaining nominal value that is less than the minimum nominal value, a cashless payment using the banknote account is blocked, for example. Thus, for example, a minimum balance of the banknote account is set in the form of the guaranteed minimum nominal value. In this case, for example, a cash-based payment must be made in which the banknote is handed over. If the current nominal value of the banknote is greater than the amount to be paid, the difference may be refunded by the payee, for example in the form of change.

For example, the initial nominal value for the banknote or the starting balance of the banknote account is recorded in a central bank register and is entered by the central bank in a payment system managed by it. For example, in the course of the initialisation of the banknote, the central bank transfers the initial credit balance from an account of the central bank to the banknote account of the banknote to be initialised.

For example, the visual design, the security features incorporated and/or the format of the banknote depend on its initial nominal value. Thus, banknotes with different initial nominal values differ from each other, for example, in terms of their visual design, the security features introduced and/or the format. Banknotes with an identical initial nominal value have, for example, an identical visual design, identical security features and/or identical formats apart from one or more banknote-specific details, such as serial number, details of the year of issue, etc.

For example, the banknote comprises a visual indication of the minimum nominal value. For example, the minimum nominal value for the banknote or the minimum balance set for the banknote account is recorded in a central bank register. For example, the visual design, the security features incorporated and/or the format of the banknote depend on its minimum nominal value. Thus, banknotes with different minimum nominal values differ from each other, for example, in terms of their visual design, the security features introduced and/or the format. Banknotes with identical minimum nominal values have, for example, an identical visual design, identical security features and/or formats apart from one or more banknote-specific details, such as serial number, details of the year of issue, etc.

For example, the initial nominal value assigned to the banknote, which the banknote includes as a visual indication, is the total nominal value transferred to the banknote by the central bank to the banknote account assigned to the banknote during its initialisation. For example, the total nominal value initially assigned to the banknote is the guaranteed minimum nominal value and an initial additional nominal value portion. For example, the additional nominal value portion is variable depending on the transactions executed from and to the banknote account of the banknote. For example, the visually indicated initial nominal value is a portion of the total nominal value that is allocated to the banknote as an initial credit to the banknote account during its initialisation. For example, the corresponding portion is the minimum nominal value, although the actual total nominal value may initially be larger, i.e. may include an initial additional nominal value portion. For example, the total nominal value transferred to the banknote account during its initialisation is a minimum nominal value of the banknote, which is visually indicated on the banknote, for example. In this case, the visual indication of the initial nominal value is, for example, also a visual indication of the minimum nominal value of the banknote. For example, the minimum nominal value is different from the initial nominal value. In this case, the banknote includes, for example, a visual indication of the minimum nominal value in addition to the visual indication of the initial nominal value.

Adding a variable additional nominal value share or increasing an existing variable additional nominal value share is done, for example, by a transaction of a corresponding amount to the banknote account of the banknote. The transaction may originate from another account, such as a banknote account of another banknote or a central bank account. For example, variable additional nominal value share may be increased indefinitely. For example, the variable additional nominal value share may be increased depending on the minimum nominal value and/or the initial nominal value. For example, a maximum permissible variable additional nominal value share for the banknote account of the corresponding banknote is recorded in a register managed by the central bank. For example, the maximum allowable variable additional nominal value portion of the banknote is 100%, 200%, 300%, 400%, 500%, 600%, 700%, 800%, 900% or 1000% of the minimum nominal value of the banknote. For example, a maximum permissible variable additional nominal value share is capped uniformly for all banknotes issued by the central bank. For example, when a transaction is made to a banknote account of a banknote, as a prerequisite for executing the transaction, a check is made as to whether the transaction exceeds the maximum permissible variable additional nominal value share. If the maximum permissible variable additional nominal value share is not exceeded, the transaction is executed. If the maximum permissible variable additional nominal value share is exceeded, the transaction is not executed.

For example, the banknote may be paper-based and/or plastic-based. For example, the banknote comprises one or more material layers. The materials used for the material layers may be, for example, paper, plastics and/or metal foils. A material layer may also comprise combinations of several of these materials. For example, the material layers are laminated together. In particular, the material layers may comprise or form, in combination, electronic components, such as a security element with processor and memory, an antenna, a display, an input device and/or sensors. The banknote is flexible, for example.

For example, the banknote comprises a plurality of security features that allow the authenticity and validity of the banknotes to be verified. The plurality of security features may comprise, for example, one or more level 1, level 2 and/or level 3 security features. Level 1 security features are security features that may be directly recognised by humans and checked without any further aids. Level 2 security features are machine-readable security features that are used, for example, for commercial banknote authentication requirements. Level 3 security features are security features that are only known to the issuing central bank. Central banks use such secret machine-readable security features to ensure the integrity of the cash cycle and to guarantee that only genuine banknotes are put back into circulation. Furthermore, central banks use such level 3 security features to remove genuine banknotes from circulation, if necessary, and to destroy them in a controlled manner if the fitness for circulation of the corresponding banknotes is no longer sufficient, for example due to soiling and/or wear.

The security features may include, for example, tactile, acoustic or visible features. For example, materials such as security papers with a characteristic haptic impression and/or a characteristic sound when rubbed and/or crumpled are used to manufacture the banknote. For example, haptically detectable embossing is applied to the banknote. For example, visually detectable security features such as watermarks, see-through windows, see-through registers, register printing elements, foil elements, guilloches, iris printing elements, anti-copy screens, mottling fibres, micro-perforations, micro-lettering, optically variable printing inks, pearlescent stripes, security thread and/or special colours are used. For example, security elements such as metamerism colour combinations, fluorescent inks, diffractive optical elements and/or scrambled indicia microprint patterns are used.

For example, machine-readable security elements are used, such as infrared properties of the ink, phosphorescent inks, magnetic elements, elements with characteristic electrical conductivity and/or copy protection elements, such as a digital watermark and/or standardised patterns, for example a EURion constellation or Omron rings.

For example, the banknote includes one or more security features that are only known to and/or verifiable by the issuing central bank, i.e. level 3 security features, such as the ECB's M feature.

Security features, especially level 1 and level 2 security features, may have the advantage of allowing parties to check a banknote for authenticity and validity without much effort. This allows the banknote to be used for cash payments, which involve a transfer of the banknote from a payer to a payee.

A "communication interface" is understood here to be, for example, an interface via which data may be received and sent, wherein the communication interface may be configured as contact-based or contactless.

Communication may take place via a network, for example. A "network" is understood here to mean any transmission medium with a connection for communication, in particular a local connection or a local network, in particular a Local Area Network (LAN), a private network, in particular an intranet, and a digital private network (Virtual Private Network—VPN). For example, a computer system may have a standard radio interface to connect to a WLAN. Furthermore, it may be a public network, such as the Internet. Depending on the embodiment, this connection may also be established via a mobile network.

Contactless communication with the banknote is possible, for example, using Near Field Communication (NFC). This is a communication based on RFID technology for the contactless exchange of data by electromagnetic induction using loosely coupled coils over short distances, for example a few centimetres. NFC may be implemented, for example, according to one of the standards ISO 14443, 18092, 21481, ECMA 340, 352, 356, 362 or ETSI TS 102 190.

The communication interface of the banknote comprises, for example, an antenna for contactless communication. The antenna comprises, for example, an induction coil. The induction coil may further be configured to externally power the banknote, for example by energy harvesting. For example, the induction coil is configured to allow a terminal to couple energy into the banknote.

A "processor" is understood here and in the following to mean a logic circuit that is used to execute program instructions. The logic circuit may be implemented on one or more discrete components, in particular on a chip. A processor comprises, for example, an arithmetic unit, a control unit, registers, and data lines for communication with other components. In particular, a "processor" is understood to mean a microprocessor or a microprocessor system comprising several processor cores and/or several microprocessors.

A "memory" is understood here to mean in particular a non-volatile memory. A "non-volatile memory" is understood here to mean, for example, an electronic memory for the permanent storage of data. A non-volatile memory may be configured as a non-changeable memory, which is also referred to as a read-only memory (ROM), or as a changeable memory, which is also referred to as a non-volatile memory (NVM). In particular, this may be an EEPROM, for example a Flash EEPROM, referred to as Flash for short. A non-volatile memory is characterised by the fact that the data stored on it is retained even after the power supply is switched off.

A "protected memory area" is understood here as an area of an electronic memory to which access, i.e. read access or write access, is only possible via a processor of the security element. For example, no external access is possible to the protected memory area, i.e. data cannot be brought in here from the outside, nor may it be output to the outside. For example, data may be read out externally from the protected memory area via the processor. For example, data may be introduced into the protected memory area from the outside via the processor. According to embodiments, access from or via the processor coupled to the memory is only possible if a condition required for this is fulfilled. This may be, for example, a cryptographic condition, in particular a successful authentication and/or a successful authorisation check. Such a check may, for example, be based on an electronic signature with a signature key.

Asymmetric key pairs are used for a variety of cryptosystems and also play an important role in the signature of electronic documents. An asymmetric key pair consists of a public key, which is used to encrypt and/or decrypt data and may be passed on to third parties, and a private key, which is used to encrypt and/or decrypt data and must usually be kept secret. The public key allows anyone to encrypt data for the holder of the private key and to verify digital signatures created with the private key. A private key enables its holder to decrypt data encrypted with the public key or to create digital signatures. A signature created with a private key may be verified with the associated public key.

The creation of a digital signature, hereinafter also referred to simply as a "signature", is a cryptographic procedure in which a further data value, referred to as a "signature", is calculated for any data. A signature may, for example, be a hash value of the source data encrypted with a private cryptographic key.

A security element is understood here to be, for example, an electronic component which comprises a processor and a memory and to which only certain predefined accesses are possible. For example, only certain data values, which are stored in certain areas of the memory, may be read. For example, data values stored in a protected memory area cannot be read. For example, writing a data value into the memory of the security element requires a digital signature, the verification key of which is stored in the security element. For example, only the processor has write access to write data to a protected memory area.

The security element further provides, for example, cryptographic core routines in the form of cryptographic program instructions with cryptographic algorithms for signature generation and/or verification, key generation, and/or random number generation, and may further serve as a secure store for cryptographic keys.

For example, at least parts of the security element are signed. Before the security element is used, it is checked whether the signature or signatures are valid. If one of the signatures is not valid, the use of the security element is blocked, for example.

For example, the security element has physically restricted access possibilities. Furthermore, the security element I may have additional measures against misuse, in particular against unauthorised access to data in the memory of the security element. For example, a security element comprises sensors for monitoring the state of the security element as well as its environment in order to detect deviations from normal operation which may indicate attempts at manipulation. Corresponding sensor types include, for example, a clock frequency sensor, a voltage sensor and/or a light sensor. Clock frequency sensors and voltage sensors detect, for example, deviations of clock frequency, temperature and/or voltage upwards or downwards from a predefined normal range. In particular, a security element may comprise non-volatile memory with a protected memory area.

For example, the means for protecting the security element against unauthorised tampering comprise mechanical means which are intended, for example, to prevent the security element or its parts from being opened, or which render the security element unusable in the event of an attempt to tamper with it, for example by causing a loss of data. For example, for this purpose at least parts of the security element may be enclosed, cast and/or laminated in a material, the attempted removal of which leads to an unavoidable destruction of the corresponding parts of the security element.

The visual information is, for example, information that is incorporated into the banknote in an optically readable form. For example, this information is printed, embossed, engraved, punched out of, cut out of, or incorporated into the banknote and/or a material layer of the banknote in another optically detectable way. These visual features may be detected, for example, with an optical sensor such as a camera.

The cryptogram results from the application of a cryptographic algorithm. For example, the banknote identification number and a payment-specific code are encrypted as input values with the banknote-specific cryptographic key.

According to embodiments, the identification number is also stored in the protected memory area of the memory of the security element. Embodiments may have the advantage that the identification number may also be protected from unauthorised access in an efficient manner.

According to embodiments, the banknote comprises a plurality of security features. Embodiments may have the advantage of allowing the authenticity and validity of the banknote to be verified using the security features, which are, for example, level 1, level 2 and/or level 3 security features. According to embodiments, one or more security features of the plurality of security features comprise an indication of the serial number and/or the identification number of the banknote. Embodiments may have the advantage that when the corresponding one or more security features are captured, the serial number and/or the identification number of the banknote may also be captured in each case. As part of the corresponding security features, not only the authenticity and validity of the banknote itself, but also the authenticity and validity of the serial number and/or the identification number of the banknote may be checked using the security features. Thus, for example, a link or association of the physical banknote and the banknote account of the banknote, which is identifiable, for example, using the serial number and/or the identification number of the banknote, may be provided, secured by the corresponding security features. According to embodiments, the one or more security features comprising an indication of the serial number and/or the identification number of the banknote are, for example, level 1, level 2 and/or level 3 security features.

According to embodiments, the banknote comprises the visual indication of the serial number distributed multiple times over the banknote. Embodiments may have the advantage that even if the banknote is partially damaged, the serial number may be captured. For example, serial number information is incorporated into the banknote in combination with and/or as part of multiple security features of the banknote. This could have the advantage that as long as there are enough security features to confirm the authenticity and validity of the banknote, the serial number of the banknote may be captured.

According to embodiments, the plurality of indications of the serial number is distributed over the banknote in such a way that it may be ensured that the serial number of the banknote may be determined as long as more than 50% of the banknote is present. Embodiments may have the advantage that in case of a loss of a part of the banknote it may be ensured that as long as more than 50% of the banknote is present, which is for example a prerequisite for a replacement of the banknote, the more than 50% that are present comprise the serial number of the banknote. Thus, even in the case of a partial loss of the banknote, it may be ensured that as long as the remaining part or parts of the banknote are valid, the serial number may be captured and the current nominal value of the banknote may be determined according to the banknote account.

According to embodiments, the identification number is a banknote account number of the anonymous banknote account individually assigned to the banknote. According to embodiments, the identification number is a number generated independently of the serial number of the banknote. According to embodiments, the independently generated identification number is associated with the serial number of the banknote. For example, the identification number is associated with the serial number using an entry in a register maintained by the central bank that associates the identification number with the serial number.

According to embodiments, the identification number is the serial number of the banknote. According to embodiments, the identification number is a banknote account number of the anonymous banknote account individually associated with the banknote, generated using the serial number. Embodiments may have the advantage that the banknote account associated with the banknote may be identified using the details of the banknote, such as the serial number of the banknote, and thus the current nominal value of the banknote may be determined.

According to embodiments, the identification number is an identification number assigned to the banknote account number of the anonymous banknote account individually assigned to the banknote, for example in a register entry of a register managed by the issuing central bank. According to embodiments, the identification number is generated independently of and assigned to the serial number of the banknote, for example in a register entry of a register managed by the issuing central bank. According to embodiments, the identification number is generated independently of the banknote account number of the anonymous banknote account individually assigned to the banknote and is assigned to it, for example in a register entry of a register managed by the issuing central bank.

Embodiments may have the advantage that in a register-based assignment, access to the register may be necessary to determine the associated banknote account for a banknote. In the case of a register managed by the issuing central bank, for example, it is possible only for the corresponding central bank to determine the banknote account assigned to a banknote.

According to embodiments, the payment-specific code comprises a timestamp and/or a random number. Embodiments may have the advantage that the cryptogram may be efficiently individualised for each payment. Embodiments may have the advantage of ensuring that cryptograms may be efficiently individualised. In other words, it may be excluded, for example, that the same cryptogram is generated for two different payments with the same banknote, even if identical amounts are paid to identical payees. If, for example, a cryptogram is presented to the central bank for the authorisation of a payment, which has already been processed by the central bank, it follows that the cryptogram presented is not (or no longer) valid.

According to embodiments, the banknote-specific cryptographic key is a symmetric cryptographic key. According to embodiments, the banknote-specific cryptographic key is a private cryptographic key of a banknote-specific asymmetric key pair.

According to embodiments, the serial number and/or the banknote identification number is the one public cryptographic key of the banknote-specific asymmetric key pair, a number derived from the banknote's public cryptographic key and/or a number assigned to the banknote's public cryptographic key. A corresponding assignment may be performed, for example, using a corresponding assignment entry in a register managed by the issuing central bank.

According to embodiments, the banknote comprises a visual indication of the public cryptographic key of the banknote, a value derived from the public cryptographic key of the banknote and/or a value associated with the public cryptographic key of the banknote. A corresponding assignment may be performed, for example, using a corresponding assignment entry in a register managed by the issuing central bank.

According to embodiments, one or more security features of the plurality of security features comprise an indication of the public cryptographic key of the banknote, a value derived from the public cryptographic key of the banknote and/or a value assigned to the public cryptographic key of the banknote. A corresponding assignment may be performed, for example, using a corresponding assignment entry in a register maintained by the issuing central bank. Embodiments may have the advantage that the public cryptographic key of the banknote, a value derived from the public cryptographic key of the banknote and/or a value assigned to the public cryptographic key of the banknote may each be included in a detection of the corresponding one or more security features. As part of the corresponding security features, the security features may be used to check not only the authenticity and validity of the banknote itself, but also the authenticity and validity of the public cryptographic key of the banknote, a value derived from the public cryptographic key of the banknote and/or a value assigned to the public cryptographic key of the banknote. Thus, for example, a connection or association of the physical banknote and the banknote account of the banknote, secured by the corresponding security features, may be provided, which is identifiable, for example, using the public cryptographic key of the banknote, a value derived from the public cryptographic key of the banknote and/or a value assigned to the public cryptographic key of the banknote. According to embodiments, the one or more security features comprising an indication of the serial number and/or the identification number of the banknote are, for example, level 1, level 2 and/or level 3 security features.

According to embodiments, the payment request specifies an amount to be paid and the amount to be paid is used as an additional input value for generating the payment-specific cryptogram. Embodiments may have the advantage that the amount to be paid is further taken into account when customising the cryptogram.

According to embodiments, the payment authorisation further comprises the identification number and/or the payment-specific code in plain text. Embodiments may have the advantage that the identification number and/or payment-specific code provided in plain text may be used to check the validity of the cryptogram. Furthermore, the identification number may be used to identify the banknote account from which the payment is to be made.

According to embodiments, the payment authorisation further comprises the amount to be paid in plain text. Embodiments may have the advantage that the amount provided in plain text may be used to check the validity of the cryptogram. Furthermore, the amount to be paid may be seen without additional cryptographic processing steps.

According to embodiments, the banknote comprises a communication interface for communicating with a terminal. The banknote receives the payment request from the terminal via the communication interface and/or sends the payment authorisation to the terminal via the communication interface.

According to embodiments, the banknote comprises a user interface for communicating with a user of the banknote, wherein the banknote receives the payment request from a user via an input device of the user interface and/or sends the payment authorisation to the user interface for output via a display device of the user interface, The terminal may be, for example, a terminal of a vendor at a point of sale (PoS), i.e. at the place where a sale is made. The terminal may also be a terminal connected to a user computer system through which a payment with the banknote is to be processed. For example, this may be a payment processing over a network, such as the internet, to a service provider, whether a vendor or a payment service provider. Similarly, the terminal could be provided in the form of a user's mobile portable communication device, such as a smartphone. For example, the user could use the mobile portable communication device for payment processing over a network, such as the internet, to a service provider, whether a vendor or a payment service provider.

According to embodiments, the banknote comprises a user interface for communicating with a user of the banknote, wherein the banknote receives the payment request from a user via an input device of the user interface and/or sends the payment authorisation to the user interface for output via a display device of the user interface. Embodiments may have the advantage of being visible to the user and/or controlling what data is entered into the banknote and what data the banknote outputs.

The input device may comprise, for example, a touch pad. The display device may, for example, comprise a display. The input device may be combined for example with the display device, for example in the form of a touch display. The user enters the payment request data, for example using the banknote input device.

For example, the payment request and/or payment authorisation is displayed to the user on the banknote's display device. Confirmation of the displayed payment request and/or payment authorisation by the user using the banknote's input device is, for example, a prerequisite for generating the payment authorisation.

For example, the payment authorisation is sent to the banknote's display device for display, such as an alphanumeric character string, bar code, or QR code. The payment authorisation displayed on the display device may, for example, be scanned using an optical sensor, such as a sensor on a terminal.

According to embodiments, a current nominal value of the banknote is further stored in the memory of the security element. Embodiments may have the advantage that the current nominal value may be read from the banknote. However, for example, the actual binding nominal value of the banknote is determined by the account balance of the associated banknote account.

For example, the current nominal value is stored in the protected memory area of the memory of the security element. For example, the current nominal value is not stored in the protected memory area of the security element memory. For example, the current nominal value of the banknote stored in the security element memory is externally readable. For example, the current nominal value of the banknote stored in the memory of the security element is not externally readable. For example, the current nominal value of the banknote stored in the memory of the security element is only used for an internal check, such as whether an amount to be paid is less than or equal to the current nominal value of the banknote.

According to embodiments, the serial number of the banknote is further stored in the memory of the security element.

According to embodiments, the initial nominal value of the banknote is initially stored in the memory of the security element as the current nominal value. Embodiments may have the advantage that, starting from this initial nominal value, the stored nominal value is adjusted with each successfully processed payment and thus the current nominal value may be tracked on the banknote side.

According to embodiments, when executing the program instructions, the processor is further configured to compare the amount to be paid with the stored current nominal value of the banknote and to generate the payment-specific cryptogram to authorise the payment only on the condition that the stored current nominal value is greater than or equal to the amount to be paid. Embodiments may have the advantage of ensuring that the current nominal value is sufficient for the payment to be executed.

According to embodiments, the processor is further configured to execute, upon execution of the program instructions, an update procedure for updating the stored current nominal value of the banknote. The update procedure comprises:

> receiving an update request to update the current nominal value of the banknote stored in the memory of the security element, wherein the update request comprises an updated nominal value of the banknote together with a cryptographically secured confirmation from the issuing central bank for the updated nominal value,
>
> verifying the cryptographically secured confirmation using a cryptographic verification key stored in the security element memory,
>
> in case of a successful verification, replacing the current nominal value of the banknote stored in the memory of the security element with the received updated nominal value.

Embodiments may have the advantage of ensuring that the stored nominal value is updated. According to embodiments, the cryptographic verification key is the banknote-specific cryptographic key, for example a symmetric cryptographic key. According to embodiments, the cryptographic verification key is a cryptographic verification key additional to the banknote-specific cryptographic key stored in the memory of the security element, for example a public cryptographic key of an asymmetric key pair assigned to the central bank. The signature verification key is stored in the security element during the manufacture of the banknote, for example.

According to embodiments, the update request is received in response to sending the payment authorisation. For example, the confirmation from the central bank for the updated nominal value is a payment confirmation from the central bank. For example, the updated nominal value is the previous nominal value of the banknote minus the amount paid.

According to embodiments, the update request is sent in response to a payment transfer of an additional amount to the anonymous banknote account individually assigned to the banknote. For example, the updated nominal value is the previous nominal value of the banknote plus the additional amount. Embodiments may have the advantage of also taking into account changes in the nominal value during a payment transfer of an additional amount to the banknote.

According to embodiments, a payment transfer of an additional amount to the banknote account of the banknote does not require authorisation by the corresponding banknote.

According to embodiments, an authorisation by the corresponding banknote is necessary for a payment transfer of an additional amount to the banknote account. The authorisation is carried out, for example, analogously to the authorisation of payments with the banknote. The authorisation comprises, for example:

> receiving a payment request for a payment on the banknote account of the banknote,
>
> generating a payment-specific cryptogram for authorising the payment on the banknote account of the banknote, wherein the cryptogram is generated from the identification number of the banknote and a payment-specific code as input values using the banknote-specific cryptographic key,
>
> sending a payment authorisation comprising the payment-specific cryptogram.

For example, the payment-specific cryptogram for authorising payment transfers of the additional amount to the banknote account of the banknote may be formed in an analogous manner to the payment-specific cryptogram for authorising payments with the banknote. Embodiments may have the advantage of ensuring that the banknote is aware of payments to the banknote account and associated changes to the nominal value of the banknote.

According to embodiments, the cryptographically secured confirmation of the issuing central bank comprises the encrypted updated nominal value of the banknote. According to embodiments, the cryptographically secured confirmation of the issuing central bank comprises the updated nominal value together with the identification number and/or the serial number of the banknote in encrypted form. According to embodiments, the cryptographically secured confirmation of the issuing central bank comprises the updated nominal value together with a time stamp in encrypted form. According to embodiments, a hash function is first applied to the data to be encrypted, for example updated nominal value, identification number, serial number and/or time stamp, and the resulting hash value is encrypted.

According to embodiments, the cryptographically secured confirmation is further received together with the banknote account number, the serial number of the banknote and/or the time stamp. According to embodiments, the update request comprises the banknote identification number, the banknote serial number and/or the time stamp in plain text, in addition to the updated denomination. According to embodiments, the cryptographically secured confirmation is decrypted for verification using the verification key and the hash value is compared with a reference hash value calculated using, for example, the plaintext data also sent. If there is a match, the verification is successful.

According to embodiments, the updated denomination is encrypted using the banknote-specific cryptographic key in the form of a symmetric cryptographic key. According to embodiments, the verification key is the banknote-specific cryptographic key in the form of a symmetric cryptographic key, using which the cryptographically secured confirmation may be decrypted for verification.

According to embodiments, the updated nominal value is encrypted using a private cryptographic key of an asymmetric key pair associated with the central bank, which serves as a signature key. According to embodiments, the verification key is a public cryptographic key of the asymmetric key pair associated with the central bank stored in the memory of the security element, using which the cryptographically secured confirmation may be decrypted for verification.

According to embodiments, the banknote receives the update request from a terminal via the communication interface and/or sends the current nominal value of the banknote stored in the memory of the security element to the terminal via the communication interface. Embodiments may have the advantage that the terminal may provide a communication link for the banknote to the central bank or a server of the central bank.

According to embodiments, the processor is further configured to execute an output method for outputting the stored current nominal value of the banknote upon execution of the program instructions. The output method comprises:

> receiving an output request to output the current nominal value of the banknote stored in the security element memory,
>
> in response to the output request, sending the current nominal value of the banknote stored in the security element memory.

Embodiments may have the advantage that the current nominal value stored in the banknote may be queried directly and thus knowledge of it may be obtained. The query may be made, for example, using a terminal or, if present, using a user interface of the banknote. The response is sent, for example, to the terminal or to a display device of the user interface for display.

According to embodiments, the sent current nominal value of the banknote is signed with the banknote-specific cryptographic key in the form of a private cryptographic key of an asymmetric key pair associated with the banknote. According to embodiments, the recipient of the signed current nominal value, for example a terminal such as a terminal of a PoS, a user computer system and/or mobile portable telecommunication device, may verify the signature using a public cryptographic key of the asymmetric key pair associated with the banknote as a signature verification key.

According to embodiments, the sent current nominal value is unsigned. For example, a confirmation request is sent to the central bank to confirm the received current nominal value of the banknote.

According to embodiments, the serial number and/or the identification number of the banknote is sent together with the stored current nominal value of the banknote and serves as an identifier of the banknote for the recipient of the current nominal value for a confirmation request to the central bank to confirm the received current nominal value of the banknote.

According to embodiments, the banknote comprises a communication interface for contactless communication with a mobile portable telecommunications device. The banknote receives the output request from the mobile portable telecommunication device via the communication interface and/or sends the current nominal value of the banknote stored in the memory of the security element to the mobile portable telecommunication device via the communication interface.

According to embodiments, the banknote comprises a user interface for communicating with a user of the banknote. The banknote receives the output request from a user via an input device of the user interface and/or sends the current nominal value of the banknote stored in the memory of the security element to the user interface for output via a display device of the user interface.

According to embodiments, the processor is further configured to execute, upon execution of the program instructions, an output method for outputting the banknote identification number and/or serial number stored in the memory of the security element, wherein the output method comprises:
  receiving an output request to output the banknote's identification number and/or serial number stored in the security element's memory,
  in response to the request, sending the identification number and/or serial number of the banknote stored in the memory of the security element.

According to embodiments, the serial number and/or the identification number of the banknote serves the recipient as an identifier of the banknote for a query of the current nominal value of the banknote at the issuing central bank. Embodiments may have the advantage that the current nominal value of the banknote may be queried at the issuing central bank with a corresponding identifier and thus knowledge of this may be obtained in a reliable form.

Embodiments comprise a method for issuing a banknote. The issuing method comprises:
  manufacturing the banknote, wherein the banknote further comprises a security element comprising a processor and a memory containing program instructions,
  receiving an identification number of the banknote via a first cryptographically secured channel, wherein the identification number identifies an anonymous banknote account managed by a central bank issuing the banknote and individually assigned to the corresponding banknote,
  storing the received identification number in the memory of the security element,
  receiving a banknote-specific cryptographic key via a second cryptographically secured channel independent of the first channel,
  storing the received banknote-specific cryptographic key in a protected memory area of the security element memory.

According to embodiments, the manufactured banknote comprises, for example, a visual indication of a banknote serial number uniquely identifying the banknote from a predefined range of serial numbers. According to embodiments, the manufactured banknote comprises, for example, a visual indication of the identification number. According to embodiments, the manufactured banknote comprises, for example, a visual indication of an initial nominal value assigned to the banknote.

Embodiments may have the advantage that the banknote may be initialised in a secure manner, i.e. identification number and banknote-specific cryptographic key may be introduced.

According to embodiments, the issuing method is configured to issue any of the previously described embodiments of the banknote. According to embodiments, the banknote issued using the issuing method is a banknote according to any of the previously described embodiments.

According to embodiments, the identification number is also stored in the protected memory area of the memory of the security element. Embodiments may have the advantage that the identification number may be stored securely.

According to embodiments, the method further comprises storing the initial nominal value of the banknote as the current nominal value in the memory of the security element. According to embodiments, the method further comprises storing the serial number of the banknote in the memory of the security element. Embodiments may have the advantage that the current nominal value and/or the serial number of the banknote are comprised by the banknote in electronic form.

According to embodiments, the method further comprises storing a public cryptographic key of an asymmetric key pair of the issuing central bank. According to embodiments, the public cryptographic key is used as a verification key for verifying signatures of the issuing central bank.

According to embodiments, the method further comprises sending a manufacture confirmation to the issuing central bank to confirm the manufacture of the banknote. The manufacture confirmation includes the serial number and the initial nominal value of the manufactured banknote for storage in a first register of the issuing central bank. The initial nominal value indicates the current nominal value of the banknote at the time of issue. The banknote identification number and the banknote-specific cryptographic key are received in response to the sending of the manufacture confirmation for storage in the security element.

Embodiments may have the advantage of ensuring that the manufacture of the banknote is accompanied by a central bank initialisation of a banknote account that is assigned to the banknote. The assignment is performed by the central bank using the serial number and the initial nominal value. Furthermore, the correspondingly assigned identification number and the correspondingly assigned banknote-specific cryptographic key are made available to the manufactured banknote and the assignment is also reproduced on the banknote side.

According to embodiments, the first register is a publicly accessible register of the central bank. According to embodiments, the serial number serves as a database access key for reading the current nominal value of the banknote from the first register. Embodiments may have the advantage that the current nominal value of a banknote is generally accessible.

According to embodiments, the identification number and the banknote-specific cryptographic key are received in response to the sending of the manufacture confirmation after the issuing central bank has stored the identification number and/or the banknote-specific cryptographic key in a second register, which assigns the identification number and/or the banknote-specific cryptographic key with the serial number of the banknote. Embodiments may have the advantage that the link or assignment between the physical banknote on the one hand and the digital banknote account on the other hand may be made by a corresponding entry in the second register.

According to embodiments, the identification number serves as a database access key for reading the serial number of the banknote and/or the banknote-specific cryptographic key from the second register. According to embodiments, the serial number serves as a database access key for reading the identification number of the banknote and/or the banknote-specific cryptographic key from the second register.

According to embodiments, the registers managed by the central bank, e.g. the first and/or the second register, are implemented as a blockchain. According to embodiments, the banknote identification number is a blockchain address of the banknote. For example, the banknote account is implemented using a blockchain or as a blockchain address. For example, the banknote-specific cryptographic key is a private cryptographic key of a banknote-specific asymmetric key pair, which further comprises a public cryptographic key of the banknote, from which, for example, the blockchain address of the banknote is derived.

A "blockchain" is understood here and in the following to be an ordered data structure comprising a plurality of interlinked data blocks. In particular, a blockchain is understood to be an ordered data structure in which each of the blocks (except the first block) comprises a check value, for example a hash value, of its predecessor block and thus the validity of all its predecessor blocks may be checked and possibly confirmed on the basis of each block. For examples of a blockchain, see https://en.wikipedia.org/wiki/Block_chain_(database) and "Mastering Bitcoin", Chapter 7, The Blockchain, page 161 ff. The concept of the blockchain was described, for example, in 2008 in a white paper on Bitcoin under the pseudonym Satoshi Nakamoto ("Bitcoin: Peer-to-Peer Electronic Cash System" (https://bitcoin.org/bitcoin.pdf)). The blockchain described therein consists of a series of data blocks, each of which contains one or more entries or transactions and is provided with a checksum in the form of a hash value. Additional blocks of the blockchain are generated, for example, in a computationally intensive process also known as mining.

These additionally generated blocks are then added to the blockchain and distributed via a network to all participants or nodes of the network.

Embodiments may have the advantage that the blockchain provides a high level of security against subsequent manipulation by storing cryptographic checksums, i.e. hash values, of the preceding block in each subsequent block. The chaining of the blocks may then be checked using these root hash values. Each block of the blockchain contains the hash of the entire previous block header in its header. Thus, the order of the blocks is unambiguously determined and a chain structure is created. By chaining the individual blocks together in this way, it is practically impossible to subsequently modify previous blocks or individual entries, as this would require the hash values of all subsequent blocks to be recalculated in a short time.

A blockchain may also be implemented, for example, in the form of a blockchain, wherein only a selected group of participants has authorisation to add valid blocks. A corresponding authorisation may be proven, for example, by means of a signature using a private cryptographic key. The private cryptographic key may belong to an asymmetric key pair, which also includes a public cryptographic key that may be used to verify the signature. The asymmetric key pair may also be assigned, for example, a certificate that proves the authorisation to create a valid block of the blockchain. This certificate may further be assigned a PKI that proves the authenticity of the certificate. According to a further embodiment, a public key may be stored in the blockchain in an initialisation entry for further participants who are to be added to the selected group. These public keys may be used to check whether signatures of blocks and thus the corresponding blocks themselves are valid. Public keys of original participants of the selected group may, for example, be deposited in a genesis block of the blockchain.

The present blockchain managed by a central bank is, for example, a public blockchain which is managed on blockchain servers of the central bank. For example, new blocks are added exclusively by these blockchain servers managed by the central bank. In this case, for example, computationally intensive processes may be omitted when adding additional blocks. For example, adding additional blocks only requires a signature with a signature key assigned to the central bank.

Consensus may also be implemented in a blockchain in other ways. For example, consensus may be reached by voting on the inclusion of proposed entries in the blockchain. For example, each participant or blockchain server maintains a unique list of other participants that it trusts as a group. Each participant may propose additional entries to be included in an additional block of the blockchain. The inclusion and thus the recognition of the validity of the proposed entries is voted on. For example, each participant only votes on those proposals that come from participants on their list. In other words, in order to decide whether a proposal for an additional entry is recognised as valid, i.e. whether there is a consensus among the participants regarding the validity of this entry, only the votes of those participants who are included in the list of the participant making the corresponding proposal are taken into account. For a proposed entry to be accepted as valid, a certain minimum percentage of voting participants must vote in the affirmative, for example 80%, 90%, 95% or 100%. All proposed entries that meet this criterion are added to the blockchain. Such a vote may involve several rounds. All other proposals that do not meet the aforementioned criterion are discarded or put to a vote again when the next block of the blockchain is voted on. The aforementioned lists represent subgroups of the blockchain network that the participant leading a particular list trusts as a group as a whole, without the need to trust each individual participant in the list. An example of such a consensus procedure is provided by the Ripple Protocol Consensus Algorithm (David Schwartz et al.: "The Ripple Protocol Consensus Algorithm", Ripple Labs Inc., 2014, https://ripple.com/files/ripple_consensus_whitepaper.pdf).

According to embodiments, the banknote is manufactured upon receipt of an order from a central bank issuing the banknote. According to embodiments, an indication of the predefined range of serial numbers is received. According to embodiments, an indication of the initial nominal value intended for the banknote is received.

Embodiments comprise a method of using a banknote. The banknote comprises a security element having a processor and a memory. An identification number of the banknote is stored in the memory of the security element and identifies an anonymous banknote account managed by a central bank issuing the banknote and individually assigned to the corresponding banknote. A banknote-specific cryptographic key is stored in a protected memory area of the security element memory.

The method for paying with the banknote comprises:
receiving a payment request for a payment with the banknote,
generating a payment-specific cryptogram for authorising the payment with the banknote, wherein the cryptogram is generated from the identification number of the banknote and a payment-specific code as input values using the banknote-specific cryptographic key,
sending a payment authorisation comprising the payment-specific cryptogram.

According to embodiments, the banknote comprises, for example, a visual indication of a banknote serial number uniquely identifying the banknote. According to embodiments, the banknote comprises, for example, a visual indication of the identification number. According to embodiments, the banknote comprises, for example, a visual indication of an initial nominal value assigned to the banknote.

Embodiments may have the advantage that the banknote may be used not only for a cash payment but also for a cashless payment, as described above.

According to embodiments, the banknote used for payment is a banknote according to any of the previously described embodiments.

According to embodiments, the payment request specifies an amount to be paid. The payment method further comprises matching the amount to be paid with a current nominal value of the banknote stored in the memory of the security element. The payment-specific cryptogram for authorising the payment is generated only on the condition that the stored current nominal value of the banknote is greater than or equal to the amount to be paid. Embodiments may have the advantage of ensuring that the banknote has sufficient nominal value to execute the payment.

According to embodiments, the method further comprises updating the stored current nominal value of the banknote:
receiving an update request to update the current nominal value of the banknote stored in the memory of the security element, wherein the update request comprises an updated nominal value of the banknote together with a cryptographically secured confirmation from the central bank for the updated nominal value,
verifying cryptographically secured confirmation using a cryptographic verification key stored in the security element memory,
in case of a successful verification, replacing the current nominal value of the banknote stored in the memory of the security element with the received updated nominal value.

Embodiments may have the advantage of ensuring that the banknote has knowledge of its assigned current nominal value according to the banknote account.

According to embodiments, the method further comprises, to output the stored current nominal value of the banknote:
receiving an output request to issue the current nominal value of the banknote stored in the security element memory,
in response to the request, sending the current nominal value of the banknote stored in the security element memory.

Embodiments may have the advantage that the current nominal value stored in the banknote may be queried directly and thus knowledge of it may be obtained. The query may be made, for example, using a terminal or, if present, using a user interface of the banknote. The response is sent, for example, to the terminal or to a display device of the user interface for display.

According to embodiments, the memory of the security element further stores the serial number of the banknote, which is sent together with the stored current nominal value of the banknote and serves as an identifier of the banknote for the recipient of the current nominal value for a confirmation request to the central bank to confirm the received current nominal value of the banknote.

Embodiments may have the advantage that the output current nominal value of the banknote may be confirmed by the central bank.

Embodiments include a method for payment processing using a terminal. The payment is made with a banknote comprising a communication interface for communicating with the terminal and a security element comprising a processor and a memory. An identification number of the banknote is stored in the memory of the security element, which identifies an anonymous banknote account managed by a central bank issuing the banknote and individually assigned to the corresponding banknote. A banknote-specific cryptographic key is stored in a protected memory area of the security element memory. The terminal comprises a processor, a memory and a communication interface for communication with the banknote.

The method for processing a payment transfer through the terminal comprises:
sending a payment request to the banknote,
receiving a payment-specific cryptogram for authorising the payment with the banknote, wherein the cryptogram is generated from the identification number of the banknote and a payment-specific code as input values using the banknote-specific cryptographic key,
forwarding the payment-specific cryptogram with an indication of the amount to be paid to the issuing central bank for a validation of the payment-specific cryptogram, performing a register check to establish whether the current nominal value of the banknote is greater than or equal to the amount to be paid, and executing the payment transfer,
if the payment transfer is successfully executed upon a successful validation and register check by the central bank, receiving a confirmation of the successful payment transfer.

According to embodiments, the banknote comprises, for example, a visual indication of a banknote serial number uniquely identifying the banknote. According to embodiments, the banknote comprises, for example, a visual indication of the identification number.

According to embodiments, the banknote comprises, for example, a visual indication of an initial nominal value assigned to the banknote.

Embodiments may have the advantage that the banknote may be used not only for a cash payment but also for a cashless payment, as described above.

According to embodiments, the banknote used for payment processing is a banknote according to any of the embodiments described above.

Embodiments may have the advantage that the central bank, in addition to its role as the institution issuing the banknote, also provides payment transaction or payment processing services to the banknote and/or the terminal or a payee using the terminal and thus acts as a traditional bank or commercial bank.

A central bank is understood here to be a national or supranational institution that has the monopoly right to issue coins and banknotes as legal tender. Furthermore, a central bank may perform monetary and currency policy tasks. For example, a central bank holds the currency reserve of a currency area, for example, it regulates the money supply, for example, it influences the creation of money by granting loans to commercial banks and/or refinances these commercial banks and the state. For example, the central bank issues banknotes and puts them into circulation.

The terminal may be, for example, a terminal of a seller at a point of sale (PoS), i.e. at the place where a sale is made. The terminal may also be a terminal connected to a user computer system through which a payment with the banknote is to be processed. For example, this may be a payment transaction over a network, such as the internet, to a service provider, whether a vendor or a payment service provider. Similarly, the terminal could be provided in the form of a user's mobile portable communication device, such as a smartphone. For example, the user could use the mobile portable communication device to process a payment over a network, such as the internet, to a service provider, whether a vendor or a payment service provider.

According to embodiments, the serial number and/or identification number of the banknote is further sent to the issuing central bank with the payment-specific cryptogram. Embodiments may have the advantage that the central bank may assign the cryptogram to a banknote or banknote account. The serial number and/or identification number of the banknote are sent to the issuing central bank in plain text, for example.

According to embodiments, the serial number and/or identification number of the banknote is received together with the payment-specific cryptogram.

According to embodiments, the payment-specific code is further received with the payment-specific cryptogram and sent with the payment-specific cryptogram to the issuing central bank. Embodiments may have the advantage that payment-specific code may be used to validate the cryptogram. For example, the payment-specific code is sent to the issuing central bank in plain text.

According to embodiments, the issuing central bank has a verification key for checking the validity of the payment-specific cryptogram. For example, the banknote-specific cryptographic key is a symmetric cryptographic key and the verification key is the same symmetric cryptographic key. For example, the banknote-specific cryptographic key is a private cryptographic key and the verification key is a public cryptographic key of the same asymmetric key pair assigned to the private cryptographic key of the banknote.

According to embodiments, the issuing central bank uses the banknote identification number to determine the serial number of the banknote, for example by performing a register search, for example of the second register.

According to embodiments, the issuing central bank uses the identification number and/or the serial number to determine the current nominal value of the banknote. For example, the determination includes register queries, for example of the first and/or second register.

According to embodiments, an identification number of a recipient account for receiving the amount to be paid is further sent to the issuing central bank. Embodiments may have the advantage that the central bank may execute the payment from the banknote or the banknote account assigned to the banknote to the recipient account.

According to embodiments, the issuing central bank uses the identification number of the beneficiary account to transfer the amount to be paid from the anonymous banknote account managed by the issuing central bank and individually assigned to the corresponding banknote to the beneficiary account upon a successful validation of the payment-specific cryptogram and a successful register check. For example, payments may be made from one banknote account to another.

According to embodiments, the payment transfer confirmation is cryptographically secured and the method further comprises verifying the confirmation using a cryptographic verification key. According to embodiments, the cryptographic verification key for verifying the payment transfer confirmation is, for example, a public cryptographic key of an asymmetric key pair assigned to the central bank.

According to embodiments, the payment transfer confirmation comprises an indication of the updated nominal value of the banknote together with a cryptographically secured confirmation from the central bank for the updated nominal value. Embodiments may have the advantage that a confirmation of the updated nominal value may be provided at the same time as the payment transfer confirmation and forwarded, for example, to the banknote to update the stored nominal value.

According to embodiments, the issuing central bank updates the nominal value of the banknote in a register. According to embodiments, the updated nominal value is the previous nominal value of the banknote minus the amount paid. For example, a register, such as the first register, may be used to view the nominal value of a banknote.

According to embodiments, the method further comprises sending an update request to update the current nominal value of the banknote stored in the memory of the security element. The update request comprises the updated nominal value of the banknote together with the cryptographically secured confirmation of the central bank for the updated nominal value. Embodiments may have the advantage of causing the banknote to update the stored nominal value.

According to embodiments, the banknote replaces the current nominal value stored in the memory of the security element with the received updated nominal value provided that the cryptographically secured confirmation check using a cryptographic verification key stored in the memory of the security element is successful. According to embodiments, the cryptographic verification key is the banknote-specific cryptographic key, for example a symmetric cryptographic key. According to embodiments, the cryptographic verification key is a cryptographic verification key stored in addition to the banknote-specific cryptographic key, for example a public cryptographic key of an asymmetric key pair associated with the central bank.

According to embodiments, the cryptographically secured confirmation comprises the encrypted updated nominal value. According to embodiments, the updated nominal value is encrypted together with the identification number or the serial number of the banknote. According to embodiments, the updated nominal value is encrypted together with a time stamp. According to embodiments, a hash function has first been applied to the data to be encrypted and the resulting hash value encrypted. Embodiments may have the advantage that the transmission of the updated nominal value may thus be carried out in a cryptographically secured manner and may be uniquely assigned to the banknote. By means of the time stamp, it may also be ensured that it is actually a current nominal value or a nominal value that is more current than a stored nominal value. For example, the banknote stores the current nominal value together with a time stamp associated with the nominal value. For example, when replacing the nominal value with an updated nominal value in the course of an update, the banknote also replaces the previously stored time stamp with an updated time stamp associated with the updated nominal value. For example, before updating the stored nominal value, the banknote checks whether a time stamp of a nominal value provided for updating is actually more current than the stored time stamp of the previous nominal value. This ensures that the timestamp used for updating is indeed a more recent timestamp.

According to embodiments, the cryptographically secured confirmation is further received together with the identification number of the banknote, the serial number of the banknote and/or the time stamp. Embodiments may have the advantage that the cryptographically secured confirmation may be uniquely assigned to the banknote.

According to embodiments, the banknote comprises a plurality of security features. The method comprises, as a prerequisite for sending the payment request, successfully capturing and validating one or more predefined security features of the plurality of security features of the banknote. Embodiments may have the advantage that the banknote may be checked for authenticity and validity using the security features.

According to embodiments, a plurality of banknotes is received. A current nominal value is determined for each of the banknotes. From the plurality of banknotes received, a set of banknotes for which the summed current nominal values result in an amount that is less than a payable amount is selected and retained. Any remaining difference between the amount to be paid and the summed amount of the set of selected banknotes is less than a current nominal value of a further banknote of the plurality of banknotes that is not included in the set of selected banknotes. The payment request to pay the difference is sent to the further banknote.

Embodiments may have the advantage that a combination of cash-based and cashless payment could be made possible. For the retained set of banknotes, there is no need for payment authorisation and/or payments using the banknote accounts of the corresponding banknotes. Rather, payment with these banknotes is made by handing over the banknotes, as is customary for cash payments. If the amount to be paid does not add up, i.e. the sum of the nominal values of the banknotes of the retained set of banknotes is less than the amount to be paid and there is no other banknote of which the nominal value corresponds to the difference amount, the payment of the difference amount is made cashlessly using another banknote of which the nominal value is greater than the corresponding difference value. Alternatively, the payment of the difference may also be made by retaining the further banknote and refunding the excess amount paid. For example, by a transaction from an account, e.g. banknote account, of the payee to a banknote account of a non-retained banknote which remains the property of the payer. According to embodiments, all non-retained banknotes are returned.

According to embodiments, the banknotes of the plurality of banknotes each comprise a plurality of security features. For example, the method comprises validating each of the banknotes. For example, the validation of the banknotes each comprises successfully capturing and validating one or more predefined security features of the plurality of security features of the corresponding banknote. Embodiments may have the advantage of ensuring the authenticity and validity of all banknotes, in particular retained banknotes.

According to embodiments, a method for replacing a damaged banknote is provided. The banknote comprises visually indicating the serial number multiple times across the banknote. If the banknote is damaged, the replacement of the banknote comprises the central bank that issued the damaged banknote:

checking a degree of damage to the banknote,
if the degree of damage to the banknote does not exceed a predefined maximum permissible degree of damage, capturing the serial number of the banknote and/or the identification number of the banknote,
initialising a lock on the register entries associated with the captured serial number and/or identification number,
determining a current nominal value of the banknote using captured serial number and/or identification number,
paying out the current nominal value of the damaged banknote.

Embodiments may have the advantage that the actual nominal value of the banknote may be replaced in the event of damage. This actual nominal value may differ significantly from the initial nominal value of the banknote and/or a minimum nominal value of the banknote. According to embodiments, for the degree of damage of the banknote not to exceed a predefined permissible maximum degree of damage, it is necessary that more than 50% of the banknote is present and/or the banknote comprises one or more valid security features necessary for replacement.

According to embodiments, the replaced banknote is a banknote according to any of the previously described embodiments. According to embodiments, the damaged banknote is retained.

According to embodiments, capturing the serial number comprises reading the visual indication of the serial number using a sensor of the terminal. According to embodiments, capturing the serial number comprises receiving the serial number sent using the communication interface of the banknote using the communication interface of the terminal.

According to embodiments, capturing the identification number comprises receiving the serial number sent using the communication interface of the banknote using the communication interface of the terminal.

According to embodiments, paying out the current nominal value of the damaged banknote comprises providing one or more banknotes as replacements, the current nominal values of which in total correspond to the current nominal value of the damaged banknote. According to embodiments, the one or more replacement banknotes are banknotes according to any of the previously described embodiments. According to embodiments, paying out the current nominal value of the damaged banknote comprises a transaction of an amount equal to the current nominal value from the bank account of the damaged banknote or a bank account of the central bank issuing the damaged banknote to a bank account specified by an owner of the damaged banknote. For example, the specified banknote account is assigned to another banknote of the owner of the damaged banknotes, to the owner of the damaged banknote personally, or to another institution chosen by the owner of the damaged banknotes.

According to embodiments, the damage includes damage to the security element such that the security element may no longer provide payment-specific cryptograms. For example, the processor, memory and/or a communication interface of the security element is damaged. For example, the security element is missing.

According to embodiments, the plurality of visual indications of the serial number is distributed over the banknote in such a way that it may be ensured that the serial number and thus the banknote account of the banknote may be determined as long as more than 50% of the banknote is present. According to embodiments, the plurality of security elements is distributed over the banknote in such a way that it may be ensured that valid security features necessary for replacement are present as long as more than 50% of the banknote is undamaged.

According to embodiments, the replacement of the banknote by the central bank issuing the damaged banknote further comprises a blocked entry in a blocking register managed by the issuing central bank. The blocked entry blocks the banknote account of the banknote. In the case of a blocked entry for the banknote account of the banknote by the central bank, it may be ensured, for example, that no money may be transferred from the blocked bank account to another account, for example banknote account, i.e. that no payments may be sent, and/or that no money may be transferred from another account, for example banknote account, to the blocked bank account, i.e. that no payments may be received.

For example, blocking the banknote account of the damaged banknote involves a transaction of any remaining balance in the bank account of the damaged banknote to a central bank account, such as a banknote account of another banknote held by the central bank. This may have the advantage that, in the course of replacing a damaged banknote, no residual amount remains in the blocked account.

Embodiments could have the advantage that when the banknote is replaced, the processor and/or the security element of the damaged banknote is not retained and may continue to be used to make payments, i.e. to issue cryptograms, after the (last) current nominal value of the damaged banknote has been paid out. Furthermore, it may be prevented, for example, that payments are inadvertently made to the banknote account of the damaged banknote after the (last) current nominal value has already been paid out and the damaged banknote has been retained.

For example, in the case of a transaction from a banknote account of a banknote, the central bank checks whether the corresponding banknote account is blocked, i.e. whether there is a blocked entry, as a prerequisite for executing the transaction. If the banknote account is not blocked, the transaction will be executed. If the banknote account is blocked, the transaction will not be executed.

For example, when a transaction is made on a banknote account of a banknote, the central bank checks whether the corresponding banknote account is blocked, i.e. whether there is a blocked entry, as a prerequisite for executing the transaction. If the banknote account is not blocked, the transaction will be executed. If the banknote account is blocked, the transaction will not be executed.

Figure 1B:
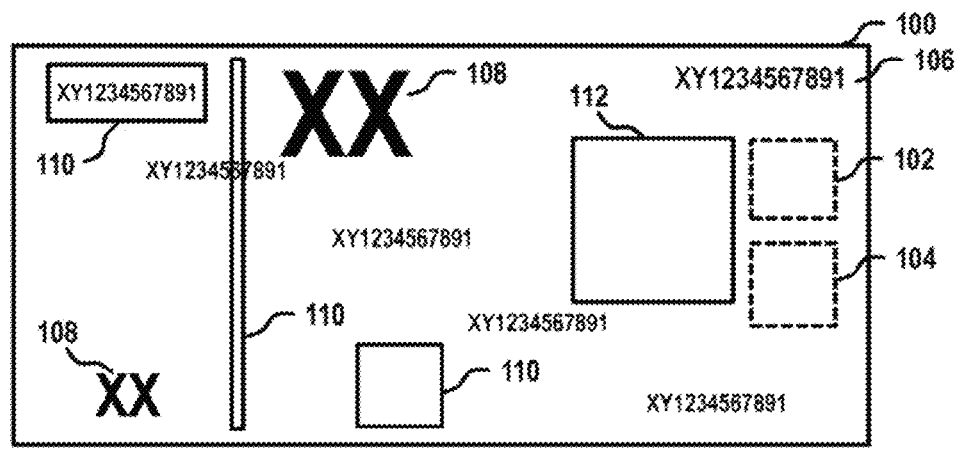
Figure 2A:
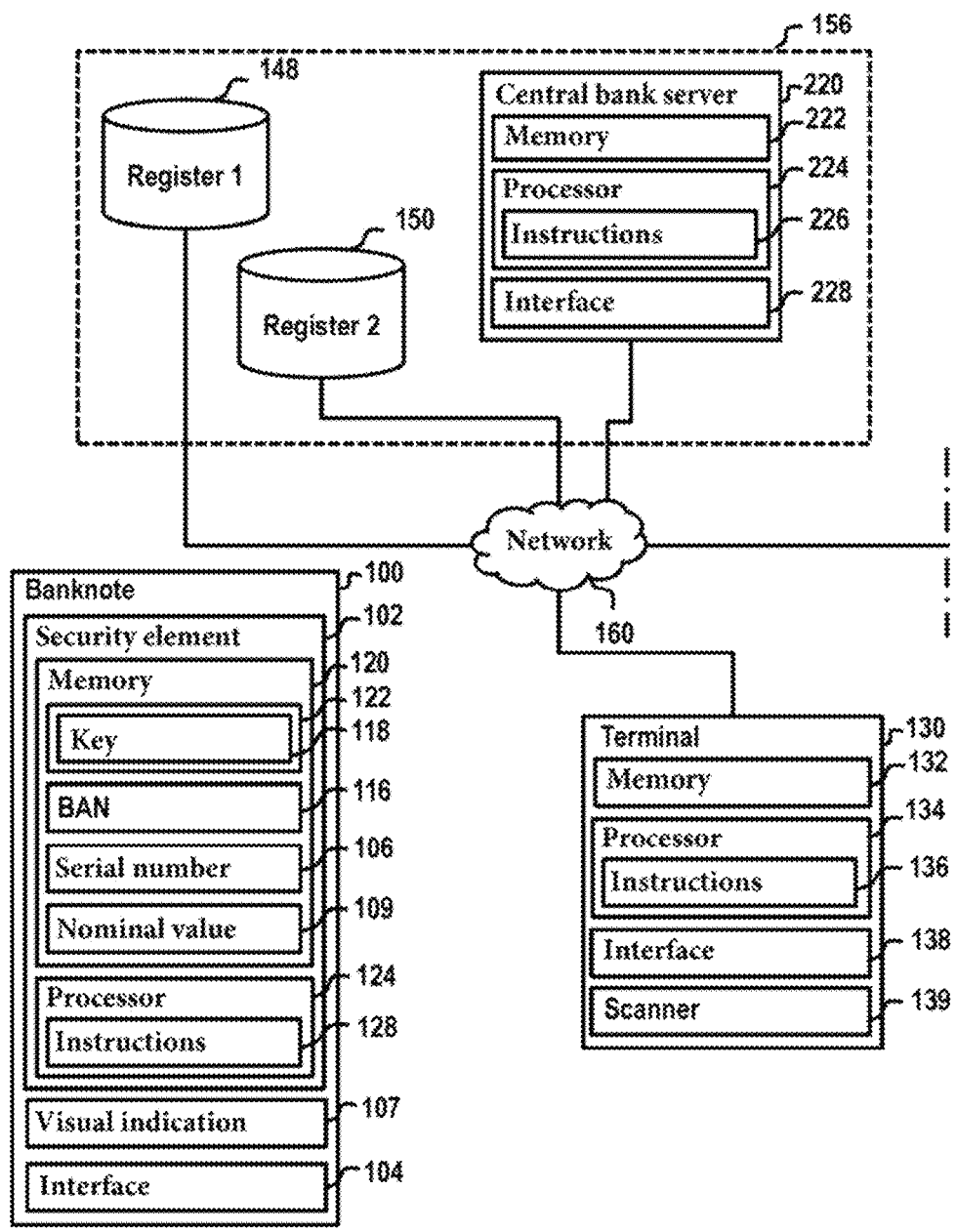
Figure 2B:
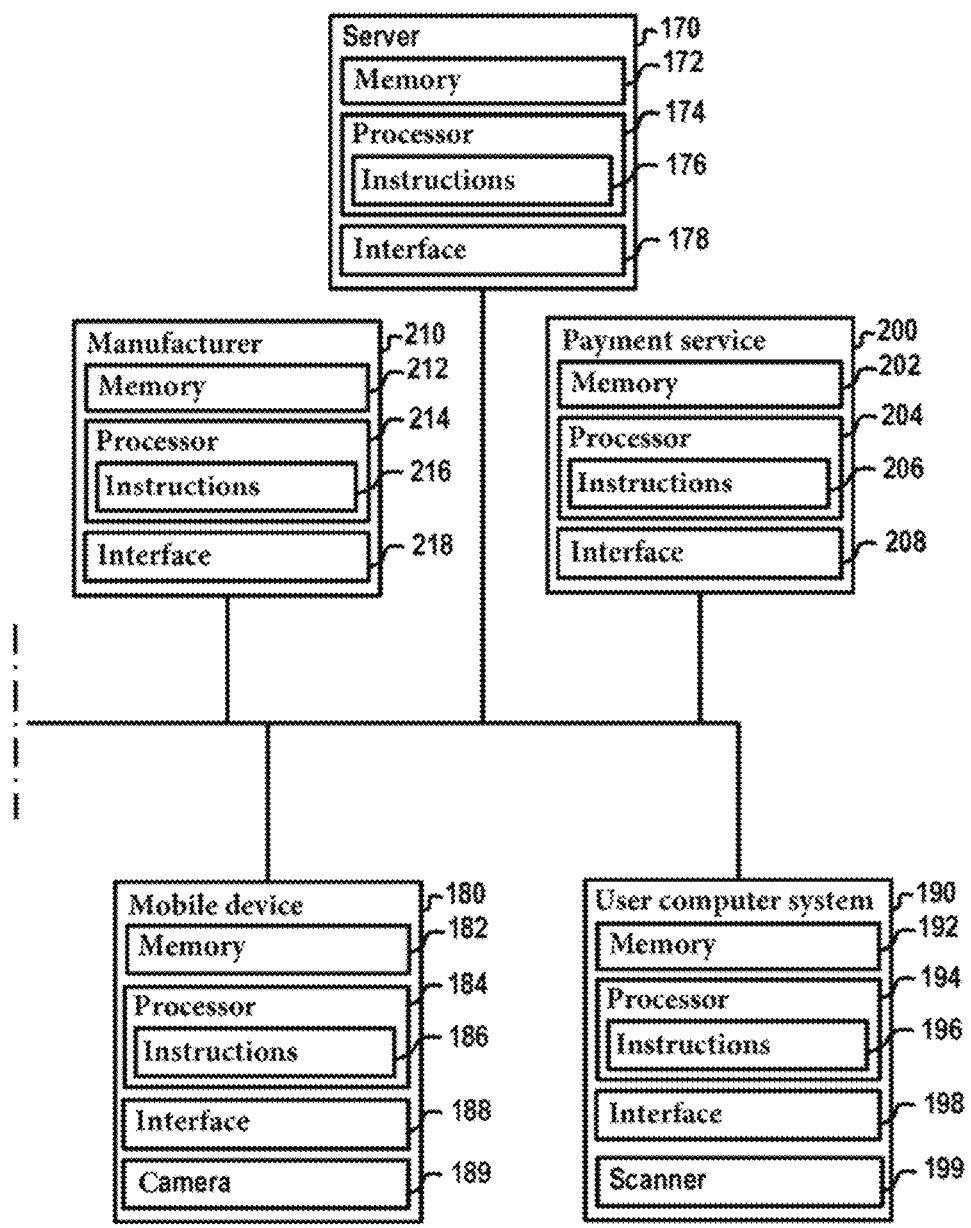
Figure 3:
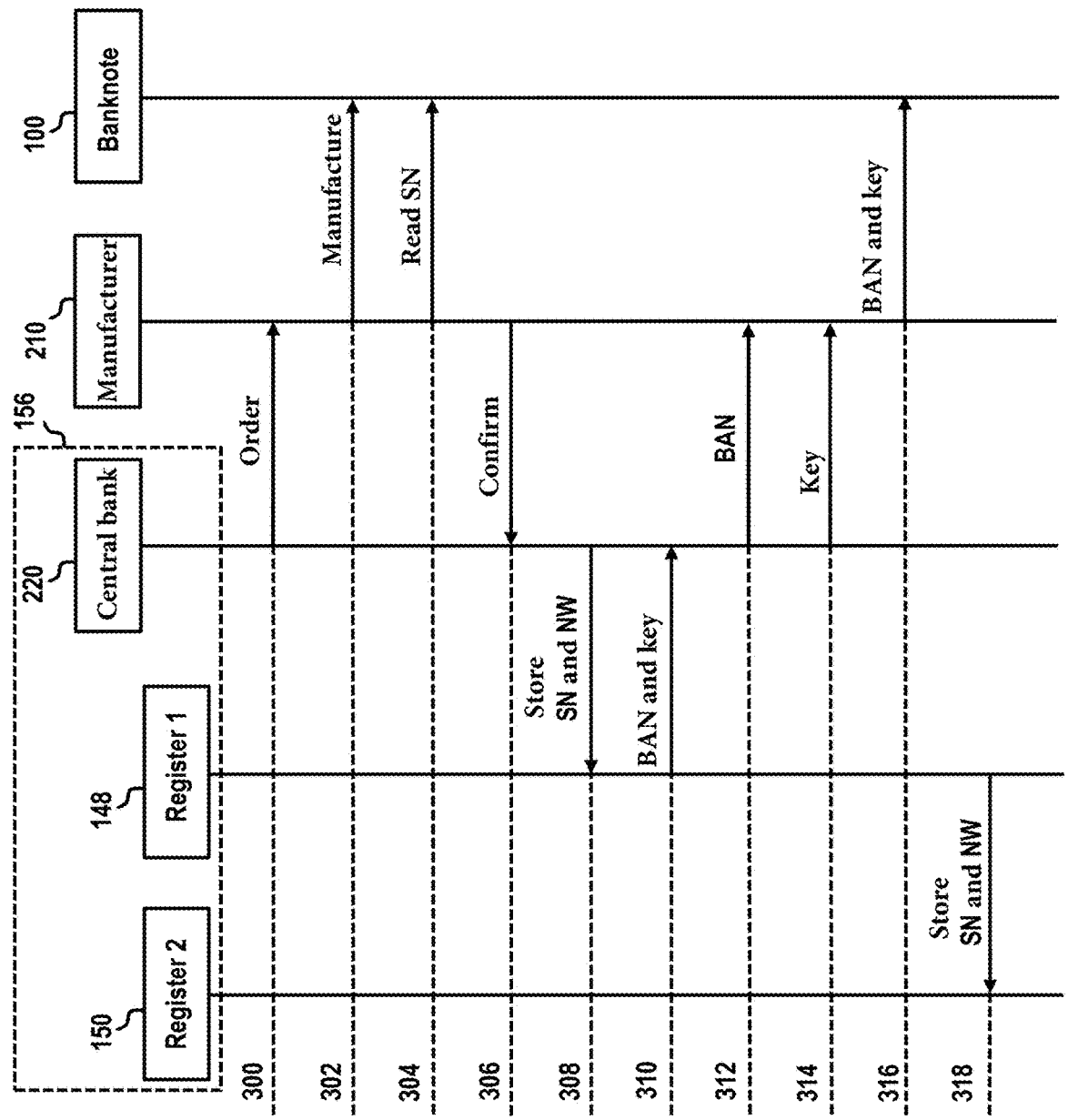
Figure 4:
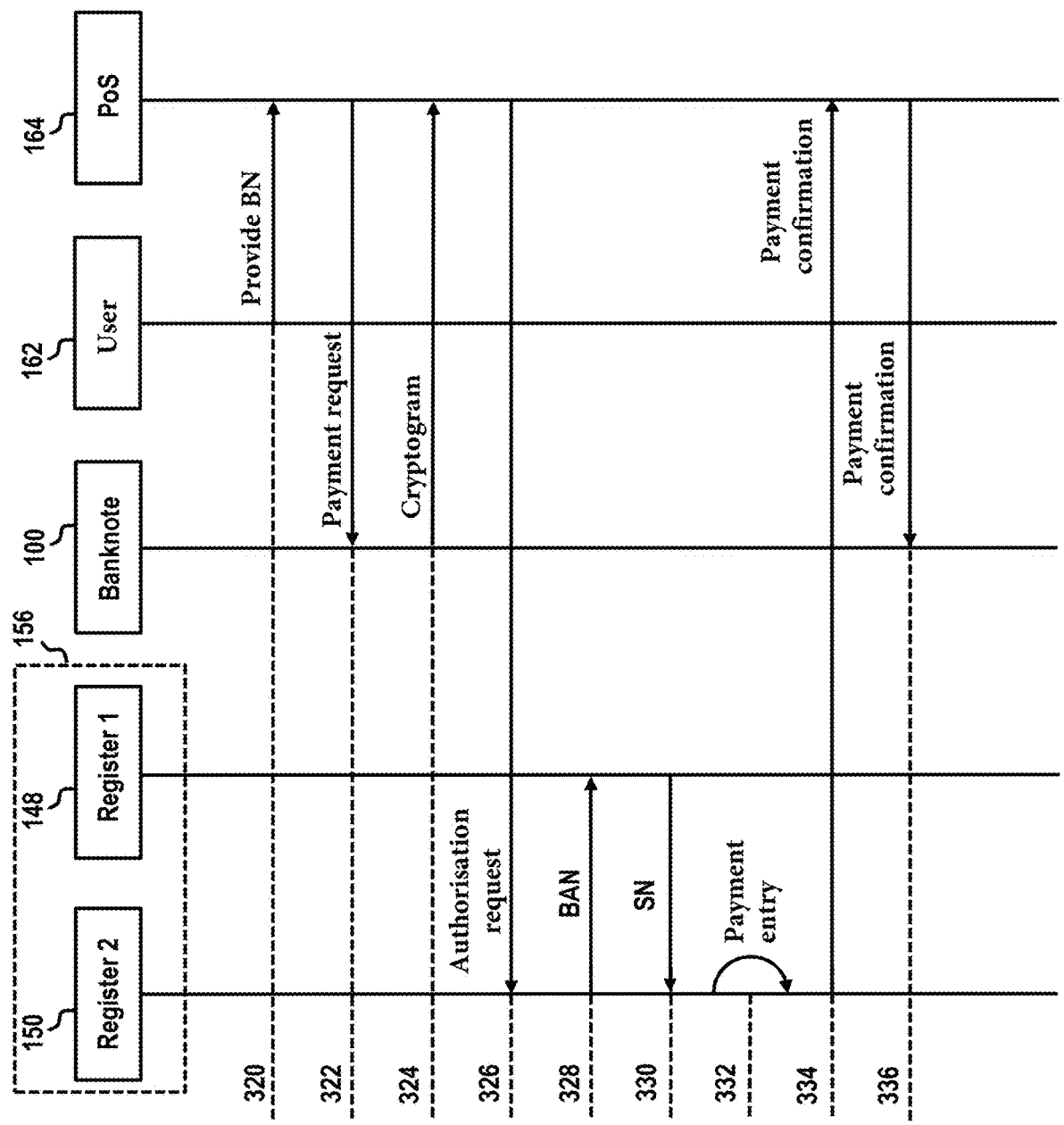
Figure 5:
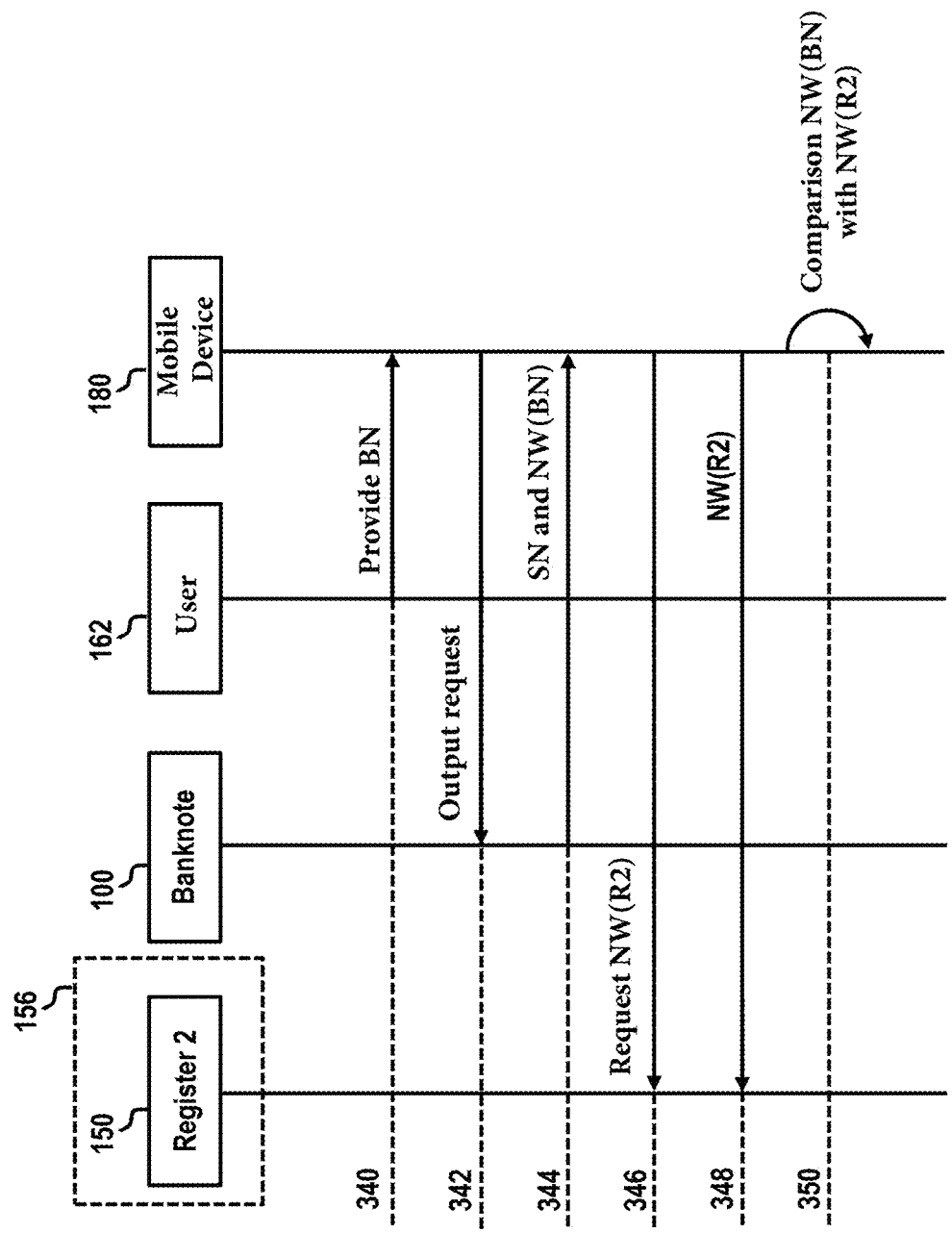
Figure 6:
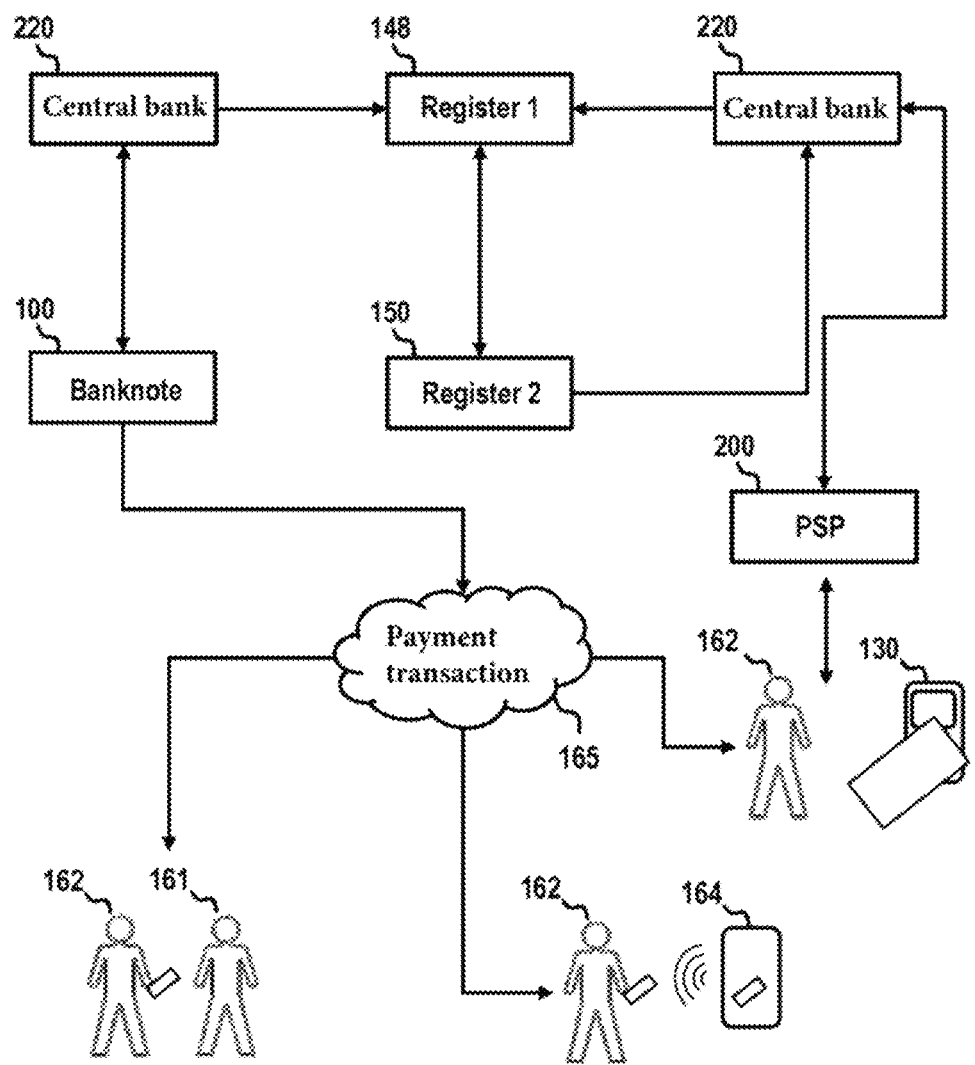
Figure 7:
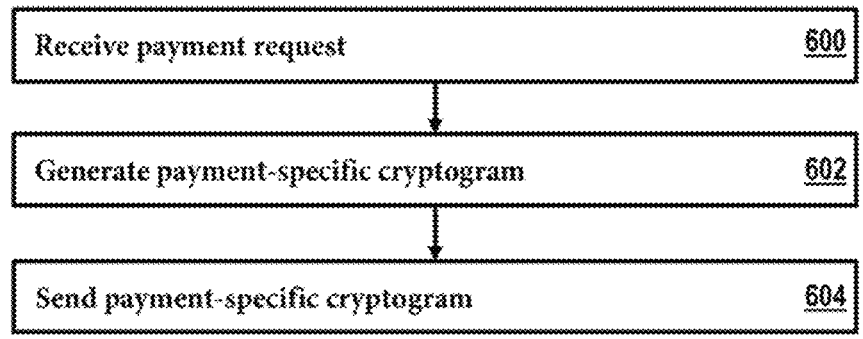
Figure 8:
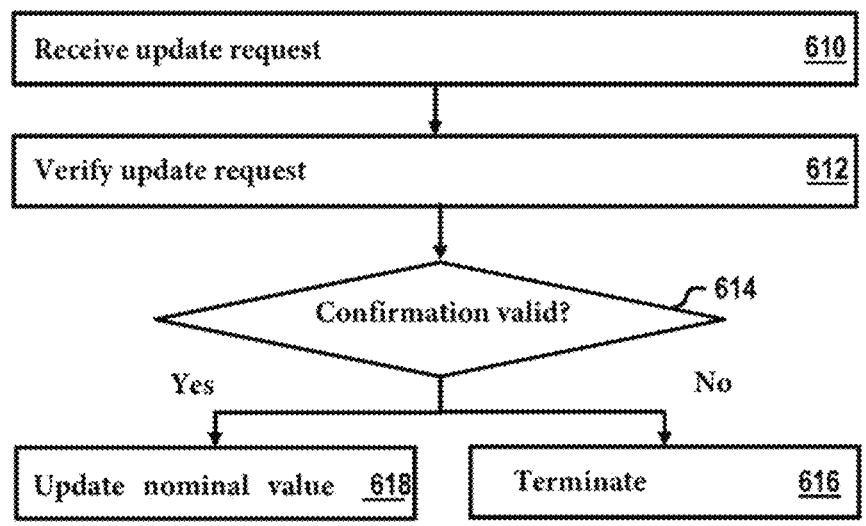
Figure 9:
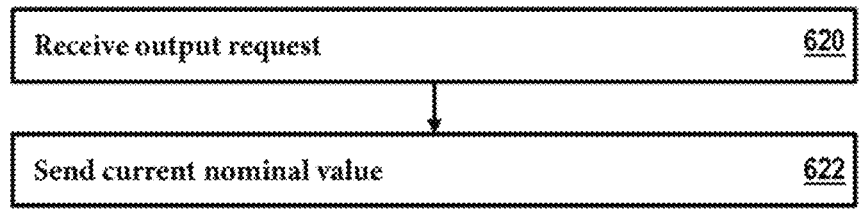
Figure 10:
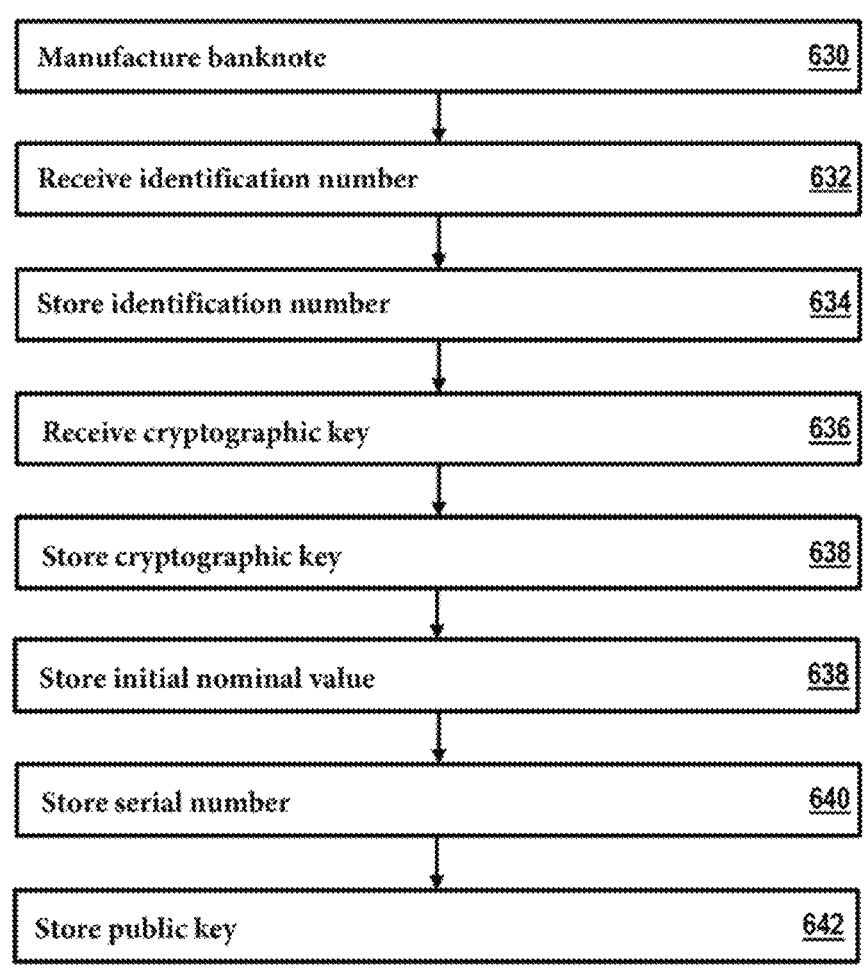
Figure 11:
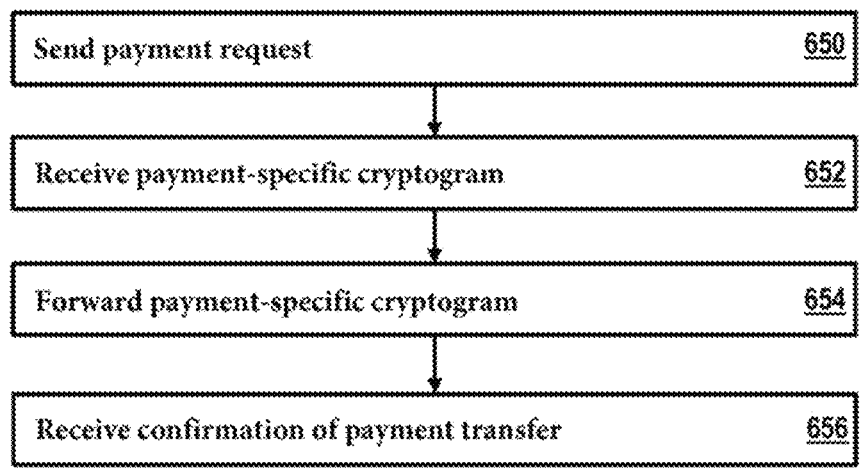
Figure 12:
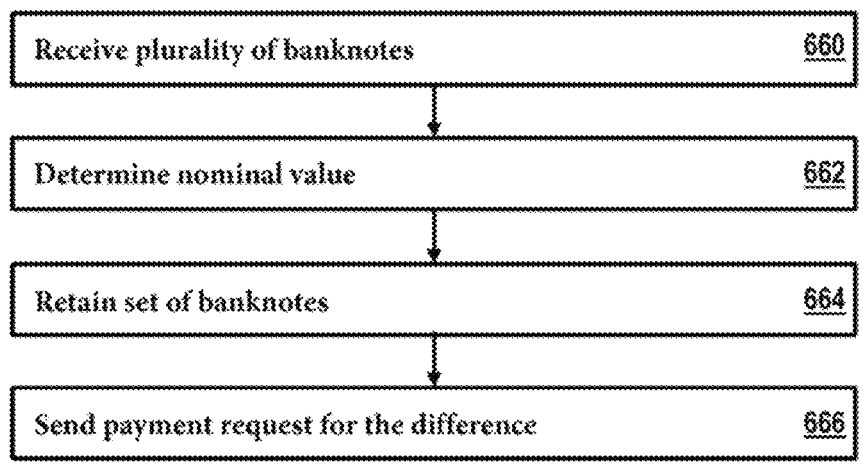

In the following, embodiments of the invention are explained in more detail with reference to the drawings, in which:

FIGS. 1A and 1B show schematic block diagrams of exemplary banknotes,

FIGS. 2A and 2B show a schematic block diagram of an exemplary system with an exemplary banknote, FIG. 3 shows a schematic flowchart of an exemplary method for issuing banknotes, FIG. 4 shows a schematic flowchart of an exemplary method for payment processing with a terminal, FIG. 5 shows a schematic flowchart of an exemplary method for confirming a current nominal value of a banknote, FIG. 6 shows a schematic block diagram of an exemplary method for using banknotes, FIG. 7 shows a schematic flowchart of exemplary methods for using a banknote, FIG. 8 shows a schematic flowchart of an exemplary method for updating a nominal value of a banknote, FIG. 9 shows a schematic flowchart of an exemplary method for issuing a nominal value of a banknote, FIG. 10 shows a schematic flowchart of an exemplary method for issuing a banknote, FIG. 11 shows a schematic flowchart of an exemplary method for payment processing with a terminal, and FIG. 12 shows a schematic flowchart of an exemplary method for payment processing with a plurality of banknotes.

Elements of the following embodiments which correspond to each other are denoted by the same reference signs.

FIGS. 1A and 1B show exemplary banknotes 100. The banknote 100 shown in FIG. 1A comprises a plurality of security features 110 that prove the authenticity and validity of the banknote 100. The security features 110 are distributed throughout the banknote 100. For example, the security features 110 are arranged in a distributed manner throughout the banknote 100 such that as long as more than 50% of the banknote is in an undamaged condition, the authenticity and validity of the banknote 100 may be demonstrated. The banknote 100 further comprises a visual indication of the serial number 106 of the banknote 100, for example printed on the banknote 100. For example, the banknote 100 comprises a plurality of visual indications of the serial number 106 arranged throughout the banknote 100, for example in microprint. For example, the serial number 106 is distributed over the banknote 100 in such a way that as long as more than 50% of the banknote is in undamaged condition, the serial number 106 of the banknote 100 may be determined. The serial number 106 serves, for example, to identify the banknote 100 and may be assigned to a current nominal value of the banknote, such as the account balance of a banknote account and/or an identification number of the banknote account of the banknote 100. For example, the current nominal value of the banknote 100 may be determined using the serial number 106 of the banknote 100.

Further, the banknote comprises one or more visual indications of an initial nominal value 108 of the banknote 100. For example, the initial nominal value 108 is a minimum nominal value of the banknote 100. For example, the banknote 100 comprises one or more visual indications of a minimum nominal value different from the initial nominal value 108 in addition to the indication of the initial nominal value 108. For example, the banknote 100 comprises the one or more visual indications of the minimum nominal value in place of visual indications of an initial nominal value 108 different from the minimum nominal value. Additionally, the banknote comprises a security element 102 comprising a processor and a memory. An identification number of the banknote 100 is stored in the memory of the security element 102. The identification number identifies an anonymous banknote account managed by a central bank issuing the banknote 100 and individually assigned to the corresponding banknote 100. A banknote-specific cryptographic key, for example in the form of a symmetric or a private cryptographic key, is stored in a protected memory area of the memory. The banknote 100 uses the banknote-specific cryptographic key to generate payment-specific cryptograms for authorising cashless payments with the banknote 100. Such cashless payments are transactions from the banknote account of the banknote 100 to a bank account, e.g. banknote account, of a payee. The cryptograms are each generated from the banknote 100 identification number and a payment-specific code as input values using the banknote-specific cryptographic key. The payment-specific code includes information characterising the individual payment, such as a time, an indication of the amount to be paid and/or an indication of the beneficiary/recipient account.

Furthermore, the banknote comprises a communication interface 104 for communicating with a terminal, in particular for contactless communication. Via the communication interface 104, the banknote 100 receives, for example, payment requests and sends, for example, payment authorisations with payment-specific cryptograms. Furthermore, the banknote 100 could include visual indications of the identification number of the banknote 100.

FIG. 1B shows an exemplary banknote 100 that corresponds to the exemplary banknote 100 in FIG. 1A. In addition, the banknote 100 in FIG. 1B comprises a user interface 112. The user interface 112 comprises, for example, an input device and/or an output device of the banknote 100. For example, the user interface 112 comprises a touchpad for inputting data, such as transaction data, into the banknote 100 and/or a display for displaying data, such as transaction data, that the banknote 100 is to process or has processed. For example, the user interface 112 comprises a touch display for both inputting data by the user and displaying data to the user.

FIGS. 2A and 2B show an exemplary system with an exemplary banknote 100. The banknote 100 comprises a security element 102 having a processor 124 and a memory 120. The processor 124 issues program instructions 128. These program instructions 128 include, for example, cryptographic program instructions for generating payment-specific cryptograms. Further, the cryptographic program instructions may be configured to generate cryptographic keys, for example. An identification number 116 of a banknote account of the banknote 100 ("banknote account number"/BAN) is stored in the memory 120. Furthermore, the memory 120 stores, for example, the serial number 106 of the banknote 100 and/or a current nominal value 109 of the banknote 100. A banknote-specific cryptographic key 118 of the banknote for generating payment-specific cryptograms is stored in a protected memory area 122 of the memory 120. Further, the banknote 100 comprises, for example, a communication interface 104 for communicating with external devices, such as a terminal 130. For example, the communication interface 104 is configured for contactless near field communication. Additionally, the banknote 100 comprises visual indications 107, such as serial number 106 and/or identification number 116. Further, the banknote 100 may further comprise, for example, a user interface comprising an input and/or output device for inputting and/or displaying data, such as transaction data.

For example, the banknote 100 communicates with a terminal 130 using the communication interface 104. The terminal 130 is, for example, a payment terminal of a PoS. The terminal 130 comprises a processor 134 for executing program instructions 136 and a memory 132. Further, the terminal 130 comprises a communication interface 137 for communicating with the banknote 100. Additionally, the terminal 130 comprises a communication interface 139 for communicating over a network 160, such as the internet. For example, the terminal 130 is configured to process a payment with the banknote 100. To do so, the terminal 130 sends, for example, a payment request to the banknote 100 and receives a payment authorisation with a payment-specific cryptogram from the banknote 100, which the terminal 130 sends via the network 160 to a central bank server 220 of a central banking system 156 for execution in the form of a transaction from the banknote account associated with the banknote 100 to a recipient account of the recipient of the payment. Further, the terminal may comprise, for example, a sensor 139. The sensor 139 is configured, for example, to detect visual indications 107 of the banknote 100, such as the serial number 106. Further, the sensor 139 may be configured, for example, to detect security features of the banknote 100 to verify its authenticity and validity. For example, the memory 132 stores an identifier or identification number of an account that the terminal 130 uses as a recipient account to receive payments.

For example, the terminal 130 communicates with the central bank server 220 via a remote server 170. For example, the server 170 includes a memory 172, a processor 174 for executing program instructions 176, and a communication interface 178 for communicating over the network 160. For example, the server 170 provides the terminal 130 with the identifier of an account or banknote account used as the recipient account. For example, the server 170 forwards payment authorisations received via the terminal 130 to the central bank server 220. For example, the server 170 forwards payment confirmations received from the central bank server 220 to the terminal 130.

The system further comprises a central bank server 220 having a memory 222 and a processor 224 for executing program instructions 226. Further, the central bank server 220 comprises, for example, a communication interface 228 for communicating over the network 160. The central bank server 220 is configured, for example, to check authorisation requests using payment-specific cryptograms to authorise payments using banknote accounts of banknotes 100 and, if the checks are successful, to execute the authorised payments. Once the payments are executed, the central bank server 220 sends, for example, payment confirmations. The payment confirmations include, for example, details of current nominal values of the banknotes resulting from the payments. Furthermore, the central bank server 220 is configured, for example, to set up a banknote-specific banknote account for the corresponding banknote 100 in the course of manufacture of a banknote 100 and/or to block an established banknote account, for example, if a damaged banknote is taken out of circulation by the central bank. Further, the central bank server 220 or other computer system of the central bank system in communication with the central bank server may comprise a sensor for checking security features of damaged banknotes. If the verification of the security features as well as the degree of damage of the banknote indicates that it is a valid banknote, the central bank replaces the damaged banknote. To do this, the central bank server 220 determines, for example, the current nominal value of the damaged banknote using an appropriate request to the registers 148, 150 managed by the central bank, pays out the current nominal value, and blocks the banknote account of the damaged banknote. For example, a blocked entry is made in one of the several registers 148, 150.

The central banking system 156 further comprises registers 148, 150. For example, the register 148 comprises assignments of the serial numbers of the individual banknotes 100 to the banknote account identification numbers of the corresponding banknote. Further, the register may assign each of the banknote account identification numbers of the individual banknotes 100 a cryptographic verification key for verifying cryptograms of the corresponding banknote 100. For example, the register 150 is configured as a look-up table, and includes, for example, assignments of current nominal values of the banknotes 100 to the serial numbers of the individual banknotes 100. For example, using the register 150, a current nominal value of a banknote 100 may be retrieved using the serial number of the corresponding banknote 100 as a database access key. Further, the central banking system 156 may comprise a booking system for performing transactions using the banknote account of the banknotes 100 issued by the central bank.

Instead of the terminal 130, a mobile portable communication device 180 or a user computer system 190, for example for payment processing via the internet, may also be used for payment processing. In this case, the mobile communication device 180 or the user computer system 190 may serve as a local PoS, for example. For example, the payment processing is performed using the remote server 170. For example, the payment processing is performed using a server 200 of a payment service provider or a financial service provider that acts as a PsP.

For example, the mobile communication device 180, such as a smartphone, comprises a memory 182 and a processor 184 for executing program instructions 186. Further, the mobile communication device 180 comprises, for example, a communication interface 187 for communicating with the banknote 100 and a communication interface 188 for communicating via the network 160. For example, the mobile communication device 180 comprises a camera for capturing visual indications 107 of the banknote 100, such as the serial number 106 of the banknote 100. For example, the mobile communication device 180 is configured to forward a payment request, such as from the server 170 or the payment service server 200, to the banknote 100 and a payment authorisation of the banknote 100 with a payment-specific cryptogram to the server 170 or the payment service server 200. For example, the mobile communication device 180 may be configured to determine, directly or through the intermediary of a server such as the server 170 or the payment service server 200, the current nominal value of the banknote 100 and display it, for example, to a user using a user interface 181. The user interface 181 comprises, for example, an input device and an output device for communication of the user with the mobile communication device 180. The input device comprises, for example, a keyboard. The output device comprises, for example, a display. For example, the input device and the output device are combined in the form of a touch display.

For example, the user computer system 190 comprises a memory 192 and a processor 194 for executing program instructions 196. Further, the user computer system 190 comprises, for example, a communication interface 197 for communicating with the banknote 100 and a communication interface 198 for communicating via the network 160. For example, the user computer system 190 comprises a sensor, such as a camera, for capturing visual indications 107 of the banknote 100, such as the serial number 106 of the banknote 100. For example, the user computer system 190 is configured to forward a payment request, such as from the server 170 or the payment service server 200, to the banknote 100 and a payment authorisation of the banknote 100 with a payment-specific cryptogram to the server 170 or the payment service server 200. For example, the user computer system 190 may be configured to determine, directly or through the intermediary of a server such as the server 170 or the payment service server 200, the current nominal value of the banknote 100 according to the banknote account assigned to the banknote 100 and display it to a user using a user interface 191. The user interface 191 comprises, for example, an input device and an output device for communication between the user and the mobile communication device 190. The input device comprises, for example, a keyboard and/or mouse. The output device comprises, for example, a display. For example, the input device and the output device are combined in the form of a touch display.

For example, the payment service provider server 200 is configured to allow payment processing using the banknote 100 and a local device for communicating with the banknote 100, such as the terminal 130, mobile communication device 180, or user computer system 190. For example, the payment service server 200 includes a memory 202, a processor 204 for executing program instructions 206, and a communication interface 208 for communicating over the network 160. For example, the payment service server 200 provides the local device with transaction data of a transaction to be executed, such as an identifier of a recipient account and/or details of the amount to be paid. For example, the payment service server 200 forwards payment authorisations received via the local device to the central bank server 220. For example, the payment service server 200 forwards payment confirmations received from the central bank server 220 to the local device.

The system further comprises, for example, a manufacturer computer system 210 used in the course of manufacturing the banknote 100. The manufacturer computer system 210 comprises, for example, a memory 212 and a processor 214 for executing program instructions 216. Further, the manufacturer computer system 210 comprises, for example, a communication interface 221 for communicating with the banknote 100. For example, in the course of initialising the banknote, the manufacturer computer system 210 sends banknote-specific data received from the central bank server 220 to the banknote 100 for storage using the communication interface 217, such as the identification number 116 or the cryptographic key 118. Further, the manufacturer computer system 210 comprises, for example, a sensor 219 for inspecting the banknote 100. Using the sensor 219, for example, a quality control of the banknote 100 is performed. If the banknote 100 passes the quality control, for example, a manufacturing confirmation is sent from the manufacturer computer system 210 to the central bank using a communication interface 218 for communicating with a central bank computer system, such as the central bank server 220. The manufacturing confirmation includes, for example, the serial number 106 and/or initialisation of the banknote 100 to the central bank system 156, and establishment of a banknote account for the manufactured banknote 100.

FIG. 3 shows a schematic flowchart of an exemplary method for issuing banknotes 100. In step 300, the central bank 220 sends an order for the manufacture of banknotes 100 to a manufacturer 210, e.g. a printing works. The order specifies, for example, a range of serial numbers. The range of serial numbers specifies serial numbers to be used for the banknotes 100 to be manufactured. For example, the order further specifies initial nominal values for the banknotes 100 to be manufactured. For example, the order specifies a minimum nominal value and/or a variable additional nominal value portion. In step 302, the manufacturer 210 manufactures the banknotes 100 according to the received order. For example, the manufactured banknotes 100 each comprise a security element comprising a processor. Further, the manufactured banknotes 100 each comprise, for example, a visual indication of one of the serial numbers from the predetermined range of serial numbers assigned to the particular banknote during the manufacturing process. In step 304, the manufacturer 210 reads each of the visual indication of the serial numbers of the manufactured banknotes 100. For example, the memories of the banknotes 100 additionally store the serial numbers of the banknotes 100. For example, the manufacturer 210 additionally reads each of the serial numbers from the memories of the banknotes 100. Further, the manufactured banknotes 100 each comprise, for example, visual indications of an initial nominal value and/or a minimum nominal value. For example, the manufacturer 210 reads the visual indications of the initial nominal value and/or the minimum nominal value of the manufactured banknotes 100. For example, the initial nominal values, minimum nominal values and/or variable additional nominal value portions assigned to the corresponding banknotes 100 are additionally stored in the memories of the banknotes 100. For example, the manufacturer 210 additionally reads each of the initial nominal value, minimum nominal value and/or variable additional nominal value portion from the memories of the banknotes 100. In step 306, a manufacturing confirmation is sent to the central bank 220 identifying the manufactured banknotes 100. For example, the manufacturing confirmation indicates the serial numbers of the manufactured banknotes 100. For example, the manufacturing confirmation indicates the initial denominations of the manufactured banknotes 100. For example, the manufacturing confirmation indicates minimum nominal values and/or variable additional nominal value portions of the initial nominal values.

In step 308, the central bank 220 stores the serial numbers of the manufactured banknotes in a first register or database 148. For example, the central bank further stores for each of the manufactured banknotes 100 the associated nominal value, minimum nominal value and/or variable additional nominal value portion of the initial nominal value. In step 310, for each of the manufactured banknotes 100 of which the serial numbers are stored in the first register 148, the first register 148 or the central bank system 156 managing the first register 148 generates an identification number identifying an anonymous banknote account managed by the central bank 220 and individually assigned to the corresponding banknote 100. The identification number is therefore a banknote account number (BAN). The serial number is used, for example, to identify the banknote, and the identification number is used, for example, to identify the banknote account for a payment transaction. For example, the serial number is used as a seed to generate the identification number for the corresponding banknote. For example, a seed of the central bank 220 is also used to generate the identification number. For example, the seed of the central bank is a secret of the central bank 220, such as a random number, a symmetric cryptographic key, or a private cryptographic key. Further, the first register 148 or the central bank system 156 managing the first register 148 generates a banknote-specific cryptographic key for each of the manufactured banknotes 100. This banknote-specific cryptographic key is, for example, a banknote-specific symmetric cryptographic key or a private cryptographic key of a banknote-specific asymmetric key pair. The BAN and the banknote-specific cryptographic key are passed internally from the first register 148 to a server of the central bank 220.

In step 312, a first cryptographically secured channel is established between a server of the central bank 220 and a computer system of the manufacturer 210. The BAN is sent from the central bank 220 to the manufacturer 210 via this first cryptographically secured channel. The first cryptographically secured channel is, for example, an end-to-end encrypted communication link between the central bank 220 and the manufacturer 210. The link is encrypted, for example, with a first symmetric session key. In step 314, a second cryptographically secured channel is established between the server of the central bank 220 and the computer system of the manufacturer 210. This second cryptographically secured channel is used to send the banknote's individual cryptographic key from the central bank 220 to the manufacturer 210. The second cryptographically secured channel is, for example, an end-to-end encrypted communication link between the central bank 220 and the manufacturer 210. The link is encrypted, for example, with a second symmetric session key.

In step 316, the manufacturer 210 stores the BAN and the banknote-specific cryptographic key in a memory of the security element of the particular banknote. For example, the banknote-specific cryptographic key is stored in a protected memory area of the memory of the security element. Further, in step 318, the first register 148 registers the serial numbers of the manufactured banknotes in a second register or database 150. For example, the central bank further stores, for each of the manufactured banknotes 100, the associated nominal value, minimum nominal value and/or variable additional nominal value portion of the initial nominal value in the second register 150. Here, the serial number serves, for example, as a database access key for accessing the information stored in the second register 150 regarding the nominal value of the corresponding banknote. The second register is, for example, a publicly accessible register, which may be configured in the form of lookup tables (LUT) or conversion tables. The second register allows, for example, anyone with the serial number of a banknote to look up the current nominal value of the corresponding banknote, for example via the internet.

FIG. 4 shows a schematic flowchart of an exemplary method for payment processing with a terminal of a PoS ("Point of Sale") 164. In step 320, the user 162 provides a banknote 100 for a cashless payment. In step 322, the PoS 164 creates a payment request for payment of a specific amount and sends the payment request to the banknote 100. In step 324, the banknote 100 or the security element of the banknote 100 generates a payment-specific cryptogram to authorise the payment. The cryptogram is generated, for example, from the banknote identification number and a payment-specific code as input values using the banknote-specific cryptographic key. The payment-specific code includes, for example, a time stamp. Furthermore, the payment-specific code or cryptogram may include as further input values the amount to be paid and an identification number of an account of the payee to which the amount is to be paid. For example, a hash function or other one-way function is applied to the input values to generate the cryptogram and the result is encrypted with the banknote-specific cryptographic key. Alternatively, the input values could be encrypted with the banknote-specific cryptographic key without applying a one-way function. The banknote 100 sends a payment authorisation comprising the payment-specific cryptogram to the PoS 164. In addition to the cryptogram, the payment authorisation comprises, for example, the input values used to generate the cryptogram in encrypted form or in plain text, i.e. in unencrypted form. In step 326, the PoS 164 sends an authorisation request to validate the payment authorisation of the banknote 100 to the central banking system 156. In step 328, the central banking system 156 extracts the BAN from the payment authorisation. For example, if the payment authorisation includes the BAN in encrypted form, the central banking system 156 decrypts the BAN. For this purpose, in the case of a symmetric banknote-specific cryptographic key, the central banking system 156 has, for example, a symmetric banknote-specific cryptographic key. In the case of a private cryptographic key of a banknote-specific asymmetric key pair, for example, the central banking system 156 has an associated public cryptographic key of the banknote-specific asymmetric key pair.

The central banking system 156 sends the BAN to the first register 148 to validate that the BAN is a valid BAN registered in the first register 148 of an existing banknote account of the banknote. Furthermore, the cryptogram is checked for validity, i.e. it is checked whether it has been encrypted with the banknote-specific cryptographic key of the banknote 100 belonging to the BAN. For example, in addition to the BAN, the first register 148 comprises a verification key for verifying the banknote-specific cryptographic key. The verification key is, for example, a symmetric or public cryptographic key for decrypting encryptions created with the banknote-specific cryptographic key. In step 330, if the BAN is a valid BAN, the first register 148 confirms the BAN and provides the serial number of the corresponding banknote 100 associated with the BAN. The serial number is used to look up the current nominal value of the banknote in the second register 150. If the current nominal value of the banknote 100 stored in the second register 150, which is the credit balance on the banknote account of the banknote 100, is sufficient for the payment, the payment is made in step 332. For this purpose, the central bank transfers the amount to be paid from the banknote account of banknote 100 to a recipient account identified, for example, in the payment authorisation. Furthermore, the current nominal value in the second register 150 is updated, i.e. reduced by the amount paid. This updated nominal value of the banknote is, for example, the updated account balance or credit balance in the banknote account of the banknote 100. In step 334, the central banking system 156 sends a payment confirmation to the PoS 164. The payment confirmation includes, for example, the updated nominal value of the banknote 100. Further, the payment confirmation is signed, for example, with a signature key of the central banking system 156. In step 336, the payment confirmation is forwarded from the PoS to, for example, the banknote 100. The banknote 100 verifies, for example, the signature of the central banking system 156 or the central bank 220 with a signature verification key. The signature verification key for verifying the signature of the central banking system 156 or the central bank 220 is stored in the banknote 100 or in the memory of the security element of the banknote 100, for example, during manufacture. The signature key is, for example, a private cryptographic key of an asymmetric key pair of the central banking system 156, while the signature verification key is, for example, a public cryptographic key of the corresponding asymmetric key pair. If the signature verification is successful, the banknote 100 replaces the nominal value stored in the memory of the security element with, for example, the updated nominal value according to the payment confirmation of the central banking system 156.

FIG. 5 shows a schematic flowchart of an exemplary method for confirming a current nominal value 109 of a banknote 100. In step 340, the user 162 provides a banknote 100 to a mobile portable communication device 180, e.g. a smartphone, for determining the current nominal value of the corresponding banknote 100. For example, the user does this by using an app installed on the mobile communication device 180 in which the user requests verification of the nominal value stored in the banknote. In step 342, the mobile communication device 180 then sends an output request to output the current nominal value stored in the memory of the security element of the banknote 100 and, for example, the serial number of the banknote as an identifier of the banknote 100. In step 344, the banknote 100 sends in response the stored nominal value NW(BN) and the serial number of the banknote 100 to the mobile communication device 180. The serial number may also be detected using visual indication thereof with an optical sensor of the mobile communication device 180, such as a camera. In step 346, the mobile communication device 180 further sends a request for the current nominal value stored in the second register 150 for the serial number of the banknote 100 to the central banking system 156. In step 348, the mobile communication device 180 receives in response the current nominal value NW(R2) stored in the second register 150 for the banknote 100. In step 350, the mobile communication device 180 compares the two nominal values NW(BN) and NW(R2). If the two values match, the mobile communication device 180 confirms the nominal value stored in the banknote 100 as current and displays it, for example on a display device such as a display, to the user 162. If the two values do not match, the mobile communication device 180 forwards the current nominal value NW(R2) stored in the second register 150 to, for example, the banknote 100 to update the nominal value stored therein. To prove the authenticity of the nominal value NW(R2), it is signed by the central banking system 156, for example with a signature key.

FIG. 6 shows a schematic block diagram of exemplary methods for using banknotes 100. The central bank 220 issues the banknotes 100. In the course of initialising the banknotes 100, the central bank 220 generates an identification number for the banknote 100, which identifies an anonymous banknote account managed by the central bank and individually assigned to the corresponding banknote 100. Furthermore, the central bank generates, for example, a banknote-specific cryptographic key for the banknote 100. Identification number and cryptographic key are provided to the banknote 100, for example, by the central bank 220 and stored in the security element of the banknote 100. For example, the one banknote-specific cryptographic key may also be generated by the banknote 100 itself, for example as a private cryptographic key of an asymmetric key pair of the banknote 100. In this case, for example, an associated public cryptographic key of the asymmetric key pair may be provided to the central bank 220 as a verification key for verifying cryptograms of the banknote. The banknote account of the banknote 100 identified by the identification number is credited with an initial nominal value of the banknote 100 as a credit. This is done, for example, by the central bank. The initial nominal values are specified, for example, by the central bank when the banknotes 100 are manufactured. The initial nominal values are credited to the banknote accounts, or the banknotes are initialised, for example, when the central bank generates the corresponding identification number. The identification numbers are generated, for example, for a particular serial number of a manufactured banknote. The identification number, serial numbers and/or banknote-specific verification keys for verifying cryptograms of the corresponding banknotes are stored in a first register 148 maintained by the central bank 220. In a second register 150 managed by the central bank 220, the current nominal values, i.e. the current balances of the banknote accounts, are stored. The assignment to the banknotes 100 is performed, for example, on the basis of the serial numbers of the banknotes 100, which serve as database access keys for the second register 150.

Once the banknotes 100 have been manufactured, they enter free circulation 165. They may be transferred as a means of cash payment from a user 162 to a payee 161. With the transfer, not only the ownership of the banknote 100 but also of the credit balance on the banknote account assigned to the banknote 100, i.e. the current nominal value of the banknote, is transferred to the payee 161. Further, the user 162 may use the banknote 100 to make a payment using a mobile portable communication device 180, such as a smartphone. For example, payments may be processed over the Internet with the mobile communication device 180 acting as a local terminal. For example, payments may be sent or initiated from the banknote account to other accounts. For example, payments may be sent or initiated from the banknote account to other banknote accounts. Furthermore, the mobile communication device 180 may be used to verify, for example, the banknote 100 and/or a current nominal value stored on the banknote. Lastly, the banknote 100 may be used, for example, to make a payment at a terminal 130, such as a PoS. To authorise a payment, the banknote 100 generates a payment-specific cryptogram using the banknote-specific cryptographic key. The terminal may, for example, communicate with a payment service provider (PSP) 200, which, for example, processes the payment using the cryptogram. The payment service provider 200 forwards the cryptogram for payment processing, for example, to the central bank 220, which checks the cryptogram using the first register 148. If the cryptogram is valid and the nominal value of the banknote 100 is sufficient for the payment according to the second register 150, the central bank 220 records the payment and confirms it to the payment service provider 200. The payment confirmation is forwarded, for example, by the payment service provider 200 to the banknote 100 via the terminal 130. The payment confirmation includes, for example, the current nominal value of the banknote 100 resulting from the payment. The banknote 100 may update the previous nominal value stored in the banknote 100 using the current nominal value provided by the payment confirmation. In the present case, the actual nominal value of a banknote 100 is determined, for example, by the account balance or credit of the banknote account of the banknote 100.

FIG. 7 shows a schematic flowchart of an exemplary method for using a banknote. The banknote includes a visual indication of a serial number uniquely identifying the banknote and an initial nominal value of the banknote. The banknote comprises a security element comprising a processor and a memory. An identification number of the banknote is stored in the memory of the security element and identifies an anonymous banknote account managed by a central bank issuing the banknote and individually assigned to the corresponding banknote. A banknote-specific cryptographic key is also stored in a protected memory area of the security element memory.

In block 600, a payment request is received for a payment with the banknote. In block 602, a payment-specific cryptogram is generated to authorise the payment with the banknote. The identification number of the banknote and a payment-specific code serve as input values from which the cryptogram is generated using the banknote-specific cryptographic key. A payment authorisation comprising the payment-specific cryptogram is sent to block 604.

FIG. 8 shows a schematic flowchart of an exemplary method for updating a nominal value of a banknote. In block 610, the banknote receives an update request to update a current nominal value of the banknote stored in a memory of a security element of the banknote. The update request includes an updated nominal value of the banknote together with a cryptographically secured confirmation from the central bank of the updated nominal value. In block 612, the banknote verifies the update request. In block 614, in the course of checking the update request, the banknote determines whether the cryptographically secured confirmation is valid. To do this, the banknote uses a cryptographic verification key stored in the security element memory. If a corresponding confirmation is missing or invalid, the method is aborted in block 616. If the corresponding confirmation is valid, the current nominal value of the banknote stored in the memory of the security element is replaced with the received updated nominal value in block 618.

FIG. 9 shows a schematic flowchart of an exemplary method for issuing a nominal value of a banknote. In block 620, the banknote receives an output request to issue the current nominal value of the banknote stored in the security element memory. In response to the request, in block 622, the banknote sends the current nominal value of the banknote stored in the security element memory.

FIG. 10 shows a schematic flowchart of an exemplary method for issuing a banknote. In block 630, the banknote is manufactured, The manufactured banknote comprises a visual indication of a banknote serial number uniquely identifying the banknote from a predefined range of serial numbers and an initial nominal value associated with the banknote. Further, the banknote includes a security element comprising a processor and a memory containing program instructions. At block 632, an identification number of the banknote is received over a first cryptographically secured channel. This identification number identifies an anonymous banknote account managed by a central bank issuing the banknote and individually assigned to the corresponding banknote. In block 634, the received identification number is stored in the memory of the security element. In block 636, a banknote-specific cryptographic key is received via a second cryptographically secured channel independent of the first channel. In block 638, the received banknote-specific cryptographic key is stored in a protected memory area of the memory of the security element. In block 640, the initial nominal value of the banknote is stored as the current nominal value in the memory of the security element. In block 642, the serial number of the banknote is stored in the memory of the security element. In block 644, a public cryptographic key of an asymmetric key pair of the issuing central bank is stored in the memory of the banknote.

FIG. 11 shows a schematic flowchart of an exemplary method for payment processing with a terminal. This payment is made with a banknote, which comprises a visual indication of a banknote serial number uniquely identifying the banknote and an initial nominal value assigned to the banknote. Further, the banknote comprises a communication interface for communicating with the terminal and a security element comprising a processor and a memory. An identification number of the banknote is stored in the memory of the security element. This identification number identifies an anonymous banknote account, which is managed by a central bank issuing the banknote and is individually assigned to the corresponding banknote. A banknote-specific cryptographic key is stored in a protected memory area of the memory of the security element. The terminal comprises a processor, a memory and a communication interface for communicating with the banknote.

In block 650, the terminal sends a payment request to the banknote. In block 650, the terminal receives a payment-specific cryptogram to authorise the payment with the banknote. The cryptogram is generated from the banknote identification number and a payment-specific code as input values using the banknote-specific cryptographic key. In block 654, the terminal forwards the payment-specific cryptogram with an indication of the amount to be paid to the issuing central bank for validation of the payment-specific cryptogram. Furthermore, the central bank checks in a register whether the current nominal value of the banknote is greater than or equal to the amount to be paid. If all checks by the central bank are positive, the payment transfer is executed. If the payment transfer is successfully executed following a successful validation and register check by the central bank, the block 656 terminal receives a confirmation of the successful payment transfer.

FIG. 12 shows a schematic flowchart of an exemplary method for payment processing with a plurality of banknotes. In block 660, a plurality of banknotes is received. In block 662, a current nominal value is determined for each of the banknotes. In block 664, a set of banknotes for which the summed current nominal values result in an amount less than a payable amount is selected from the plurality of banknotes received and retained. In block 666, a payment request for payment of a remaining difference amount is sent to another banknote of the plurality of banknotes that is not included in the set of selected banknotes. The remaining difference between the amount to be paid and the summed amount of the set of selected banknotes is less than a current nominal value of the further banknote.

LIST OF REFERENCE SIGNS 100 banknote
102 security element
104 communication interface
106 serial number
107 visual indication
108 initial nominal value
109 current nominal value
110 security feature
112 user interface
116 identification number
118 cryptographic key
122 memory
122 protected memory area
124 processor
128 program instructions
130 terminal
132 memory
134 processor
136 program instructions
137 communication interface
138 communication interface
139 sensor
148 register 1
150 register 2
156 central bank system
160 network
162 user
161 payee
164 PoS
165 payment transaction
170 server
172 memory
174 processor
176 program instructions
178 communication interface
180 mobile portable communication device
181 user interface
182 memory
184 processor
186 program instructions
187 communication interface
188 communication interface
189 camera
190 user computer system
191 user interface
192 memory
194 processor
196 program instructions
197 communication interface
198 communication interface
199 sensor
200 payment service server
202 memory
204 processor
206 program instructions
208 communication interface
210 manufacturer computer system
212 memory
214 processor
216 program instructions
217 communication interface
218 communication interface
219 sensor
220 central computer system
222 memory
224 processor
226 program instructions
228 communication interface
229 sensor

The invention claimed is:
1. A banknote comprising:
a security element having a processor,
a memory with program instructions,
a communication interface configured to communicate with a terminal, and
one or more sensors configured to monitor a state of the security element for manipulation,
wherein the memory comprises a protected memory area accessible only through cryptographically authorized access,
wherein an identification number of the banknote is stored in the memory of the security element and identifies an anonymous banknote account managed by a central bank issuing the banknote and individually assigned to a corresponding banknote, wherein the identification number is a banknote account number of the anonymous banknote account individually assigned to the banknote, wherein a banknote-specific cryptographic key is stored in the protected memory area of the memory of the security element, wherein the memory storing the program instructions that, when executed by the processor, cause the processor to perform a payment method comprising
receiving a payment request for a payment with the banknote, wherein the payment request specifies an amount to be paid,
comparing the amount to be paid with a current nominal value of the banknote stored in the memory of the security element, wherein the comparing further comprises determining the stored current nominal value is greater than or equal to the amount to be paid,
in response to the comparing, generating a payment-specific cryptogram for authorizing the payment with the banknote, wherein the payment-specific cryptogram authorizes a transaction in which the amount to be paid is transferred from the anonymous banknote account of the banknote to an account of a recipient, wherein the payment-specific cryptogram is generated from the identification number of the banknote and a payment-specific code as input values using the banknote-specific cryptographic key, wherein the amount to be paid is used as an additional input value for generating the payment-specified cryptogram, and
sending a payment authorization comprising the payment-specific cryptogram, and
wherein the payment-specific cryptogram is transmitted via the communication interface to the terminal for forwarding to the central bank for cryptographic verification and execution.

2. The banknote according to claim 1, wherein the banknote comprises a visual indication of an initial nominal value assigned to the banknote.

3. The banknote according to claim 1, wherein the banknote comprises a visual indication of a serial number uniquely identifying the banknote and/or of the identification number.

4. The banknote according to claim 1, wherein the banknote comprises a plurality of security features, wherein one or more security features of the plurality of security features comprise an indication of a serial number and/or of the identification number of the banknote.

5. The banknote according to claim 1, wherein the payment authorization further comprises the identification number and/or the payment-specific code in plain text.

6. The banknote according to claim 1, wherein the banknote receives the payment request from the terminal via the communication interface and/or sends the payment authorization to the terminal via the communication interface.

7. The banknote according to claim 1, wherein the processor is further configured to perform an update procedure for updating the stored current nominal value of the banknote upon the execution of the program instructions, wherein the update procedure comprise
receiving an update request to update the current nominal value of the banknote stored in the memory of the security element, wherein the update request comprises an updated nominal value of the banknote together with a cryptographically secured confirmation of the central bank for the updated nominal value,
verifying the cryptographically secured confirmation using a cryptographic verification key stored in the memory of the security element, and
in case of a successful verification, replacing the current nominal value of the banknote stored in the memory of the security element with the updated nominal value included in the update request.

8. The banknote according to claim 1, wherein the processor is further configured to execute an output method for outputting the stored current nominal value of the banknote upon the execution of the program instructions, wherein the output method comprise
receiving an output request to output the current nominal value of the banknote stored in the memory of the security element, and
in response to the output request, sending the current nominal value of the banknote stored in the memory of the security element.

9. The banknote according to claim 8, wherein a serial number and/or the identification number of the banknote is sent together with the stored current nominal value of the banknote and serves as an identifier of the banknote for the recipient of the current nominal value for a confirmation request to the central bank to confirm the current nominal value of the banknote.

10. The banknote according to claim 8, wherein the communication interface is configured for contactless communication with a mobile portable telecommunication device, wherein the banknote receives the output request from the mobile portable telecommunication device via the communication interface and/or transmits the current nominal value of the banknote stored in the memory of the security element to the mobile portable telecommunication device via the communication interface.

11. The banknote according to claim 8, wherein the banknote comprises a user interface for communicating with a user of the banknote, wherein the banknote receives the output request from the user via an input device of the user interface and/or sends the current nominal value of the banknote stored in the memory of the security element to the user interface to output via a display device of the user interface.

12. A method for using a banknote, wherein the banknote comprises a security element having a processor, a memory with program instructions, and one or more sensors configured to monitor a state of the security element for manipulation,
wherein an identification number of the banknote is stored in the memory of the security element and identifies an anonymous banknote account managed by a central bank issuing the banknote and individually assigned to a corresponding banknote, wherein the identification number is a banknote account number of the anonymous banknote account individually assigned to the banknote, wherein a banknote-specific cryptographic key is stored in a protected memory area of the memory of the security element,
wherein the banknote comprises a communication interface configured to interact with a terminal to perform a digital transaction,
wherein the method for paying with the banknote, which is executed by the processor upon execution of the program instructions, comprises
receiving a payment request for a payment with the banknote, wherein the payment request specifies an amount to be paid,
comparing the amount to be paid with a current nominal value of the banknote stored in the memory of the security element, wherein the comparing further comprises determining the stored current nominal value is greater than or equal to the amount to be paid, in response to the comparing, generating a payment-specific cryptogram for authorizing the payment with the banknote, wherein the payment-specific cryptogram authorizes the digital transaction in which the amount to be paid is transferred from the anonymous banknote account of the banknote to an account of a recipient, wherein the payment-specific cryptogram is generated from the identification number of the banknote and a payment-specific code as input values using the banknote-specific cryptographic key, wherein the amount to be paid is used as an additional input value for generating the payment-specified cryptogram, and sending a payment authorization comprising the payment-specific cryptogram via the communication interface to the terminal for validation and execution by the central bank.

13. The method for using the banknote according to claim 12, further comprising:

updating the stored current nominal value of the banknote, the updating comprising receiving an update request for updating the current nominal value of the banknote stored in the memory of the security element, wherein the update request comprises an updated nominal value of the banknote together with a cryptographically secured confirmation of the central bank for the updated nominal value, verifying the cryptographically secured confirmation using a cryptographic verification key stored in the memory of the security element, and in case of a successful verification, replacing the current nominal value of the banknote stored in the memory of the security element with the updated nominal value included in the update request.

14. The method for using the banknote according to claim 12, further comprising:

outputting the stored current nominal value of the banknote, the outputting comprising receiving an output request to output the current nominal value of the banknote stored in the memory of the security element, and in response to the output request, sending the current nominal value of the banknote stored in the memory of the security element.

15. The method for using the banknote according to claim 14, wherein the memory of the security element further stores a serial number of the banknote, which is sent together with the stored current nominal value of the banknote and serves as an identifier of the banknote for the recipient of the current nominal value for a confirmation request to the central bank to confirm the current nominal value of the banknote.

16. The method for using the banknote according to claim 12, wherein the one or more sensors include one or more of a clock frequency sensor, a voltage sensor, or a light sensor.

17. The banknote according to claim 1, wherein the one or more sensors include one or more of a clock frequency sensor, a voltage sensor, or a light sensor.

* * * * *